US012579797B2

(12) United States Patent (10) Patent No.: US 12,579,797 B2
Ning et al. (45) Date of Patent: Mar. 17, 2026

(54) VIDEO PROCESSING METHOD AND APPARATUS

(71) Applicant: HUAWEI TECHNOLOGIES CO., LTD., Shenzhen (CN)

(72) Inventors: Ke Ning, Shenzhen (CN); Longhui Wei, Beijing (CN); Lingxi Xie, Beijing (CN); Jianzhuang Liu, Shenzhen (CN); Qi Tian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 553 days.

(21) Appl. No.: 17/852,684

(22) Filed: Jun. 29, 2022

(65) Prior Publication Data

US 2022/0327835 A1 Oct. 13, 2022

Related U.S. Application Data

(63) Continuation of application No. PCT/CN2020/138983, filed on Dec. 24, 2020.

(30) Foreign Application Priority Data

Dec. 31, 2019 (CN) .......................... 201911416325.7

(51) Int. Cl.
*G06V 10/82* (2022.01)
*G06V 10/80* (2022.01)
*G06V 20/40* (2022.01)

(52) U.S. Cl.
CPC ............ *G06V 10/82* (2022.01); *G06V 10/806* (2022.01); *G06V 20/46* (2022.01); *G06V 20/48* (2022.01)

(58) Field of Classification Search
None
See application file for complete search history.

(56) References Cited

U.S. PATENT DOCUMENTS 7,529,670 B1 * 5/2009 Michaelis .............. A61B 5/091
704/275
9,280,742 B1 * 3/2016 Sargin .................... G06N 20/00
(Continued)

FOREIGN PATENT DOCUMENTS

CN 103761284 A 4/2014
CN 105677735 A 6/2016
(Continued)

OTHER PUBLICATIONS

Xu et al., "Multilevel language and vision integration for text-to-clip retrieval", In Proceedings of the Thirty-Third AAAI Conference on Artificial Intelligence and Thirty-First Innovative Applications of Artificial Intelligence Conference and Ninth AAAI Symposium on Educational Advances in Artificial Intelligence (AAAI"19/IAAI"19/EAAI"19), AAAI Press, Article 1112, 2019, 8 pages.
(Continued)

*Primary Examiner* — Tsung Yin Tsai
(74) *Attorney, Agent, or Firm* — Maier & Maier, PLLC

(57) ABSTRACT

A video clip location technology in the field of computer vision pertaining to artificial intelligence that provides a video processing method and apparatus. The method includes: obtaining a semantic feature of an input sentence; performing semantic enhancement on a video frame based on the semantic feature to obtain a video feature of the video frame, where the video feature includes the semantic feature; and determining, based on the semantic feature and the video feature, whether a video clip to which the video frame belongs is a target video clip corresponding to the input sentence. The method helps improve accuracy of recognizing a target video clip corresponding to an input sentence.

18 Claims, 9 Drawing Sheets

(56) References Cited

U.S. PATENT DOCUMENTS

| | | | | |
|---|---|---|---|---|
| 10,402,658 | B2 * | 9/2019 | Min | G06N 3/09 |
| 10,853,660 | B2 * | 12/2020 | Zhang | G06F 16/3338 |
| 12,135,940 | B2 * | 11/2024 | Wang | G06V 10/82 |
| 2018/0225519 | A1 * | 8/2018 | Chen | G06V 20/47 |
| 2018/0260698 | A1 * | 9/2018 | Lin | G06F 18/24147 |
| 2018/0293313 | A1 * | 10/2018 | Hauptmann | G06F 16/7837 |
| 2019/0287142 | A1 * | 9/2019 | Fan | G06Q 30/0282 |
| 2020/0334468 | A1 * | 10/2020 | Agarwal | G06V 20/47 |
| 2021/0144442 | A1 * | 5/2021 | Liu | H04N 21/4667 |
| 2021/0209356 | A1 * | 7/2021 | Wang | G06V 30/19173 |
| 2021/0281918 | A1 * | 9/2021 | Su | G06V 10/806 |
| 2022/0248096 | A1 * | 8/2022 | Liu | G06N 3/0464 |

FOREIGN PATENT DOCUMENTS

| | | | |
|---|---|---|---|
| CN | 107766571 A | 3/2018 | |
| CN | 108491544 A | 9/2018 | |
| CN | 109408671 A | 3/2019 | |
| CN | 110225368 A | 9/2019 | |

OTHER PUBLICATIONS

Hendricks et al., "Localizing Moments in Video with Natural Language", UC Berkeley, Adobe Research, INRIA, Aug. 4, 2017, 20 pages.
Huang et al., "Cross-media retrieval based on latent semantic topic reinforce", J. of Computer Applications, vol. 37, No. 4, Apr. 10, 2017 (English Abstract included), 5 pages.

* cited by examiner

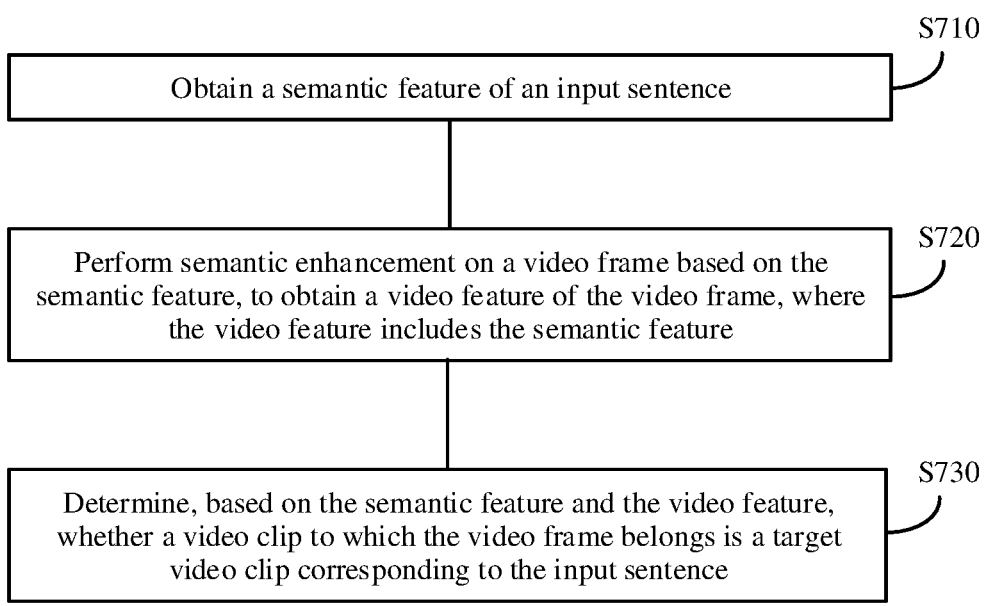

S710

Obtain a semantic feature of an input sentence

S720

Perform semantic enhancement on a video frame based on the semantic feature, to obtain a video feature of the video frame, where the video feature includes the semantic feature

S730

Determine, based on the semantic feature and the video feature, whether a video clip to which the video frame belongs is a target video clip corresponding to the input sentence

FIG. 7

VIDEO PROCESSING METHOD AND APPARATUS

CROSS-REFERENCE TO RELATED APPLICATIONS

This application is a continuation of International Application No. PCT/CN2020/138983, filed on Dec. 24, 2020, which claims priority to Chinese Patent Application No. 201911416325.7, filed on Dec. 31, 2019. The disclosures of the aforementioned applications are hereby incorporated by reference in their entireties.

TECHNICAL FIELD

The embodiments relate to the field of artificial intelligence, a video processing method, and an apparatus.

BACKGROUND

Artificial intelligence (AI) is a theory, a method, a technology, and an application system that simulate, extend, and expand human intelligence by using a digital computer or a machine controlled by a digital computer, sense the environment, obtain knowledge, and use the knowledge to obtain a best result. In other words, artificial intelligence is a branch of computer science, and is intended to understand the essence of intelligence and produce a new intelligent machine that can react in a manner similar to human intelligence. Artificial intelligence is to study design principles and implementation methods of various intelligent machines, so that the machines have perceiving, inference, and decision-making functions. Research in the field of artificial intelligence may include a robot, natural language processing, computer vision, decision-making and inference, human-computer interaction, recommendation and search, AI fundamentals, and the like.

With rapid development of artificial intelligence technologies, a deep learning technology has made great progress in both the fields of computer vision and natural language processing. In addition, joint research in the two fields, for example, research on a problem of locating a video clip (video clip) based on a natural language description, has attracted increasing attention. However, compared with a problem of detecting a static image based on a natural language description, the problem of locating a video clip based on a natural language description is more complex.

Therefore, how to locate a video clip based on a natural language description becomes an urgent problem to be resolved.

SUMMARY

The embodiments provide a video processing method and apparatus, to help improve accuracy of recognizing a target video clip corresponding to an input sentence.

According to a first aspect, a video processing method is provided. The method includes: obtaining a semantic feature of an input sentence; performing semantic enhancement on a video frame based on the semantic feature, to obtain a video feature of the video frame, where the video feature includes the semantic feature; and determining, based on the semantic feature and the video feature, whether a video clip to which the video frame belongs is a target video clip corresponding to the input sentence.

In this embodiment, semantic enhancement is performed on the video frame based on the semantic feature, to obtain the video feature of the video frame, and a semantic meaning corresponding to the input sentence may be fused into the video feature of the video frame. In this case, the target video clip corresponding to the input sentence is recognized based on the semantic feature and the video feature, so that accuracy of recognizing the target video clip corresponding to the input sentence can be improved.

The semantic feature of the input sentence may be a feature vector of the input sentence, and the feature vector of the input sentence may indicate the input sentence. In other words, the semantic feature of the input sentence may alternatively be considered as an expression in a vector form of the input sentence.

For example, the semantic feature of the input sentence may be obtained by using a recurrent neural network (RNN). Alternatively, the semantic feature of the input sentence may be obtained by using another neural network. This is not limited in this embodiment.

Similarly, the video feature of the video frame may be a feature vector of the video frame, and the feature vector of the video frame may indicate the video frame. In other words, the video feature of the video frame may alternatively be considered as an expression in a vector form of the video frame.

The video feature including the semantic feature may mean that the video feature includes the semantic meaning corresponding to the input sentence, or that the video feature carries the semantic meaning corresponding to the input sentence.

It should be noted that the semantic enhancement may refer to collaboratively constructing the video feature of the video frame based on the semantic feature or fusing the semantic feature (or may be understood as the semantic meaning corresponding to the input sentence) into the video feature of the video frame.

For example, when the video feature of the video frame is extracted, semantic enhancement may be performed on the video frame based on the semantic feature, to directly obtain a semantic-enhanced video feature (of the video frame).

For another example, an initial video feature of the video frame may alternatively be first obtained, and then semantic enhancement is performed on the initial video feature of the video frame based on the semantic feature, to obtain a semantic-enhanced video feature (of the video frame).

With reference to the first aspect, in some implementations of the first aspect, the performing semantic enhancement on a video frame based on the semantic feature, to obtain a video feature of the video frame includes: determining a word corresponding to the video frame in the input sentence; and performing semantic enhancement on the video frame based on a semantic feature of the word corresponding to the video frame to obtain the video feature of the video frame.

In this embodiment, semantic enhancement is performed on the video frame by using a semantic feature of a word most relevant to the video frame in the input sentence, so that the video feature of the video frame can be more accurate. In this case, the target video clip corresponding to the input sentence is recognized based on the video feature, so that accuracy of recognizing the target video clip corresponding to the input sentence can be improved.

With reference to the first aspect, in some implementations of the first aspect, the performing semantic enhancement on a video frame based on the semantic feature, to obtain a video feature of the video frame in the video includes: performing feature extraction on the video frame based on the semantic feature, to obtain the video feature of the video frame.

In this embodiment, feature extraction is performed on the video frame based on the semantic feature of the input sentence, and semantic enhancement may be directly performed on the video feature of the video frame in a feature extraction process. This helps improve efficiency of recognizing the target video clip corresponding to the input sentence.

With reference to the first aspect, in some implementations of the first aspect, the method further includes: obtaining an initial video feature of the video frame; and the performing semantic enhancement on a video frame based on the semantic feature, to obtain a video feature of the video frame includes: performing semantic enhancement on the initial video feature based on the semantic feature, to obtain the video feature of the video frame.

With reference to the first aspect, in some implementations of the first aspect, the method further includes: performing feature fusion on the video feature of the video frame by using a video feature of at least one other video frame to obtain a fused video feature of the video frame, where the at least one other video frame and the video frame belong to a same video; and the determining, based on the semantic feature and the video feature, whether a video clip to which the video frame belongs is a target video clip corresponding to the input sentence includes: determining, based on the semantic feature and the fused video feature, whether the video clip to which the video frame belongs is the target video clip corresponding to the input sentence.

In this embodiment, feature fusion is performed on the video feature of the video frame by using the video feature of the at least one other video frame in the video, and context information in the video is fused into the video feature of the video frame, so that the video feature of the video frame can be more accurate. In this case, the target video clip corresponding to the input sentence is recognized based on the video feature, so that accuracy of recognizing the target video clip corresponding to the input sentence can be improved.

Optionally, the video feature of the at least one other video frame may be added to the video feature of the video frame to obtain the fused video feature of the video frame.

In this case, it may be considered that the fused video feature of the video frame is fused with the video feature of the at least one other video frame.

In this embodiment, feature fusion may alternatively be performed on the video feature of the video frame by using video features of all video frames in the video other than the video frame to obtain the fused video feature of the video frame.

Alternatively, feature fusion may be performed on the video feature of the video frame by using video features of all video frames (including the video frame) in the video, to obtain the fused video feature of the video frame.

For example, an average value of video features of all video frames (including the video frame) in the video may be calculated, and the average value is added to the video feature of the video frame to obtain the fused video feature of the video frames.

For another example, the video includes t video frames in total, and video features of the t video frames may form a video feature sequence $\{f_1, f_2, \ldots, f_t\}$ of the video. $f_j$ indicates a semantic feature of a $j^{th}$ word in the input sentence, j is a positive integer less than t, and t is a positive integer. The video features in the video feature sequence $\{f_1,$ $f_2, \ldots f_t\}$ are multiplied (matrix multiplication) in pairs to obtain a matrix B (where the matrix B may be referred to as a correlation matrix, and an element in the matrix B may be referred to as a correlation feature). A correlation feature is selected for a video frame $f_j$ in the video from the matrix B, the correlation feature is added to a video feature of the video frame $f_j$ in the video to obtain a fused video feature of the video frame $f_j$ in the video.

With reference to the first aspect, in some implementations of the first aspect, the determining, based on the semantic feature and the video feature, whether a video clip to which the video frame belongs is a target video clip corresponding to the input sentence includes: determining a hierarchical structure of the video clip in time domain based on the video feature; and determining, based on the semantic feature and the hierarchical structure, whether the video clip is the target video clip corresponding to the input sentence.

In this embodiment, the hierarchical structure of the video clip in the time domain is determined by using the video feature, so that a receptive field of each video frame in the video clip is expanded, and a size of a video feature of each video frame is maintained. In this case, the target video clip corresponding to the input sentence is recognized based on the semantic feature and the hierarchical structure, so that accuracy of recognizing the target video clip corresponding to the input sentence can be improved.

Optionally, the hierarchical structure of the video clip in the time domain may be determined based on the video feature by using one-dimensional dilated convolution (dilated convolution) or one-dimensional convolution.

According to a second aspect, a video processing apparatus is provided. The apparatus is configured to perform the following operations: obtaining a semantic feature of an input sentence; performing semantic enhancement on a video frame based on the semantic feature, to obtain a video feature of the video frame, where the video feature includes the semantic feature; and determining, based on the semantic feature and the video feature, whether a video clip to which the video frame belongs is a target video clip corresponding to the input sentence.

In this embodiment, semantic enhancement is performed on the video frame based on the semantic feature, to obtain the video feature of the video frame, and a semantic meaning corresponding to the input sentence may be fused into the video feature of the video frame. In this case, the target video clip corresponding to the input sentence is recognized based on the semantic feature and the video feature, so that accuracy of recognizing the target video clip corresponding to the input sentence can be improved.

The semantic feature of the input sentence may be a feature vector of the input sentence, and the feature vector of the input sentence may indicate the input sentence. In other words, the semantic feature of the input sentence may alternatively be considered as an expression in a vector form of the input sentence.

For example, the semantic feature of the input sentence may be obtained by using a recurrent neural network (RNN). Alternatively, the semantic feature of the input sentence may be obtained by using another neural network. This is not limited in this embodiment.

Similarly, the video feature of the video frame may be a feature vector of the video frame, and the feature vector of the video frame may indicate the video frame. In other words, the video feature of the video frame may alternatively be considered as an expression in a vector form of the video frame.

That the video feature includes the semantic feature may mean that the video feature includes the semantic meaning corresponding to the input sentence, or that the video feature carries the semantic meaning corresponding to the input sentence.

It should be noted that the semantic enhancement may refer to collaboratively constructing the video feature of the video frame based on the semantic feature or fusing the semantic feature (or may be understood as the semantic meaning corresponding to the input sentence) into the video feature of the video frame.

For example, when the video feature of the video frame is extracted, semantic enhancement may be performed on the video frame based on the semantic feature, to directly obtain a semantic-enhanced video feature (of the video frame).

For another example, an initial video feature of the video frame may alternatively be first obtained, and then semantic enhancement is performed on the initial video feature of the video frame based on the semantic feature, to obtain a semantic-enhanced video feature (of the video frame).

With reference to the second aspect, in some implementations of the second aspect, the performing semantic enhancement on a video frame based on the semantic feature, to obtain a video feature of the video frame includes: determining a word corresponding to the video frame in the input sentence; and performing semantic enhancement on the video frame based on a semantic feature of the word corresponding to the video frame to obtain the video feature of the video frame.

In this embodiment, semantic enhancement is performed on the video frame by using a semantic feature of a word most relevant to the video frame in the input sentence, so that the video feature of the video frame can be more accurate. In this case, the target video clip corresponding to the input sentence is recognized based on the video feature, so that accuracy of recognizing the target video clip corresponding to the input sentence can be improved.

With reference to the second aspect, in some implementations of the second aspect, the performing semantic enhancement on a video frame based on the semantic feature, to obtain a video feature of the video frame in the video includes: performing feature extraction on the video frame based on the semantic feature, to obtain the video feature of the video frame.

In this embodiment, feature extraction is performed on the video frame based on the semantic feature of the input sentence, and semantic enhancement may be directly performed on the video feature of the video frame in a feature extraction process. This helps improve efficiency of recognizing the target video clip corresponding to the input sentence.

With reference to the second aspect, in some implementations of the second aspect, the method further includes: obtaining an initial video feature of the video frame; and the performing semantic enhancement on a video frame based on the semantic feature, to obtain a video feature of the video frame includes: performing semantic enhancement on the initial video feature based on the semantic feature, to obtain the video feature of the video frame.

With reference to the second aspect, in some implementations of the second aspect, the method further includes: performing feature fusion on the video feature of the video frame by using a video feature of at least one other video frame to obtain a fused video feature of the video frame, where the at least one other video frame and the video frame belong to a same video; and the determining, based on the semantic feature and the video feature, whether a video clip to which the video frame belongs is a target video clip corresponding to the input sentence includes: determining, based on the semantic feature and the fused video feature, whether the video clip to which the video frame belongs is the target video clip corresponding to the input sentence.

In this embodiment, feature fusion is performed on the video feature of the video frame by using the video feature of the at least one other video frame in the video, and context information in the video is fused into the video feature of the video frame, so that the video feature of the video frame can be more accurate. In this case, the target video clip corresponding to the input sentence is recognized based on the video feature, so that accuracy of recognizing the target video clip corresponding to the input sentence can be improved.

Optionally, the video feature of the at least one other video frame may be added to the video feature of the video frame to obtain the fused video feature of the video frame.

In this case, it may be considered that the fused video feature of the video frame is fused with the video feature of the at least one other video frame.

In this embodiment, feature fusion may alternatively be performed on the video feature of the video frame by using video features of all video frames in the video other than the video frame to obtain the fused video feature of the video frame.

Alternatively, feature fusion may be performed on the video feature of the video frame by using video features of all video frames (including the video frame) in the video, to obtain the fused video feature of the video frame.

For example, an average value of video features of all video frames (including the video frame) in the video may be calculated, and the average value is added to the video feature of the video frame to obtain the fused video feature of the video frames.

For another example, the video includes t video frames in total, and video features of the t video frames may form a video feature sequence $\{f_1, f_2, \ldots, f_t\}$ of the video. $f_j$ indicates a semantic feature of a $j^{th}$ word in the input sentence, j is a positive integer less than t, and t is a positive integer. The video features in the video feature sequence $\{f_1, f_2, \ldots, f_t\}$ are multiplied (matrix multiplication) in pairs to obtain a matrix B (where the matrix B may be referred to as a correlation matrix, and an element in the matrix B may be referred to as a correlation feature). A correlation feature is selected for a video frame $f_j$ in the video from the matrix B, the correlation feature is added to a video feature of the video frame $f_j$ in the video to obtain a fused video feature of the video frame $f_j$ in the video.

With reference to the second aspect, in some implementations of the second aspect, the determining, based on the semantic feature and the video feature, whether a video clip to which the video frame belongs is a target video clip corresponding to the input sentence includes: determining a hierarchical structure of the video clip in time domain based on the video feature; and determining, based on the semantic feature and the hierarchical structure, whether the video clip is the target video clip corresponding to the input sentence.

In this embodiment, the hierarchical structure of the video clip in the time domain is determined by using the video feature, so that a receptive field of each video frame in the video clip is expanded, and a size of a video feature of each video frame is maintained. In this case, the target video clip corresponding to the input sentence is recognized based on the semantic feature and the hierarchical structure, so that accuracy of recognizing the target video clip corresponding to the input sentence can be improved.

Optionally, the hierarchical structure of the video clip in the time domain may be determined based on the video feature by using one-dimensional dilated convolution (dilated convolution) or one-dimensional convolution.

According to a third aspect, a video processing apparatus is provided. The apparatus includes: a memory, configured to store a program; and a processor, configured to execute the program stored in the memory. When the program stored in the memory is executed, the processor is configured to perform the method in any one of the implementations of the first aspect.

The processor in the third aspect may be a central processing unit (CPU) or may be a combination of a CPU and a neural network operation processor. The neural network operation processor herein may include a graphics processing unit (GPU), a neural-network processing unit (NPU), a tensor processing unit (TPU), and the like. The TPU is an artificial intelligence accelerator-specific integrated circuit customized by Google for machine learning.

According to a fourth aspect, a computer-readable medium is provided. The computer-readable medium stores program code to be executed by a device, and the program code includes instructions used for performing the method in any implementation of the first aspect.

According to a fifth aspect, a computer program product including instructions is provided. When the computer program product is run on a computer, the computer is enabled to perform the method in any implementation of the first aspect.

According to a sixth aspect, a chip is provided. The chip includes a processor and a data interface. The processor reads, through the data interface, instructions stored in a memory, to perform the method in any implementation of the first aspect.

Optionally, in an implementation, the chip may further include the memory. The memory stores the instructions. The processor is configured to execute the instructions stored in the memory. When the instructions are executed, the processor is configured to perform the method in any implementation of the first aspect.

The foregoing chip may be a field-programmable gate array (FPGA) or an application-specific integrated circuit (ASIC).

According to a seventh aspect, an electronic device is provided. The electronic device includes the video processing apparatus according to any one of the implementations of the second aspect.

When the electronic device includes the video processing apparatus according to any one of the implementations of the second aspect, the electronic device may be a terminal device or a server.

In the embodiments, semantic enhancement is performed on the video frame based on the semantic feature, to obtain the video feature of the video frame, and a semantic meaning corresponding to the input sentence may be fused into the video feature of the video frame. In this case, the target video clip corresponding to the input sentence is recognized based on the semantic feature and the video feature, so that accuracy of recognizing the target video clip corresponding to the input sentence can be improved.

BRIEF DESCRIPTION OF THE DRAWINGS

FIG. 7 is a schematic flowchart of a video processing method according to an embodiment;

DETAILED DESCRIPTION OF THE EMBODIMENTS

The following describes solutions in the embodiments with reference to the accompanying drawings. It is clear that the described embodiments are merely some but not all of the embodiments. All other embodiments obtained by a person of ordinary skill in the art without creative efforts shall fall within the scope of the embodiments.

Figure 1:
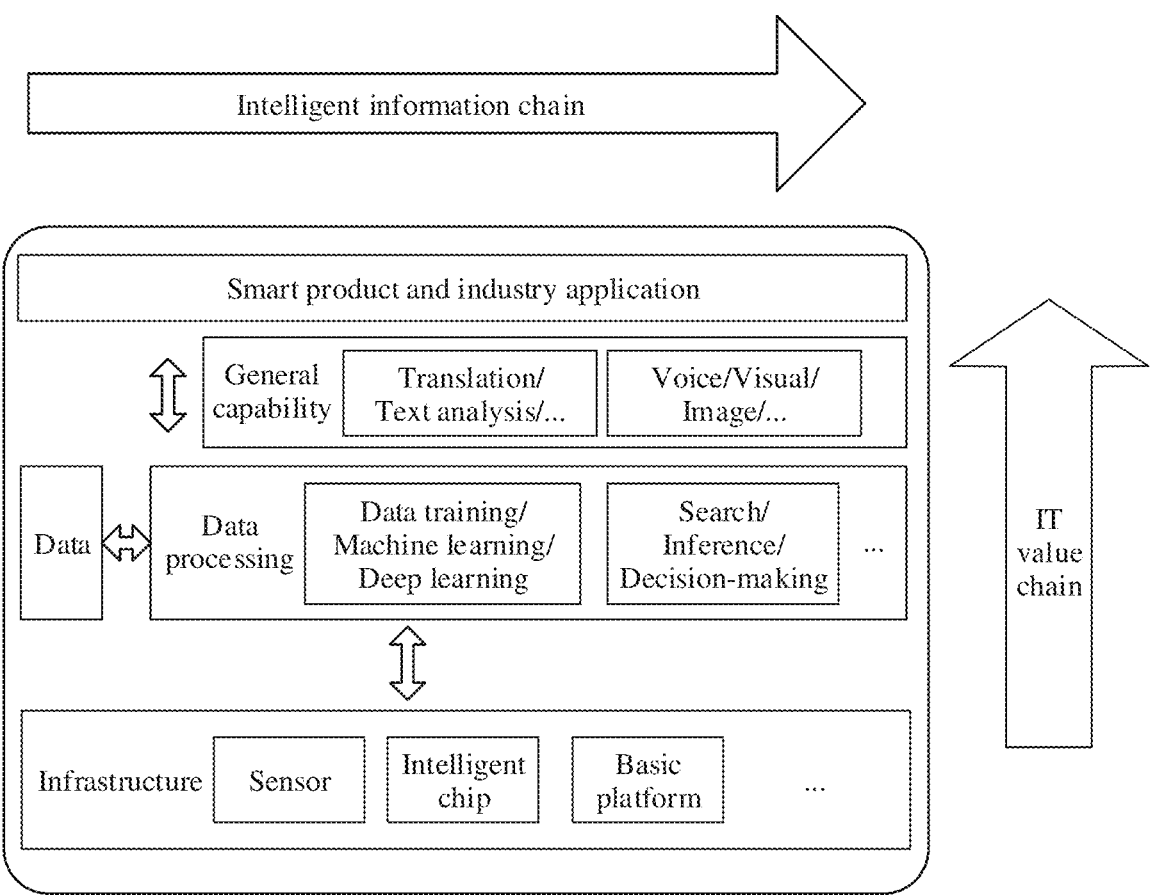
FIG. 1 is a schematic diagram of an artificial intelligence main framework according to an embodiment.

FIG. 1 is a schematic diagram of an artificial intelligence main framework. The main framework describes an overall working procedure of an artificial intelligence system and is applicable to a requirement of the general field of artificial intelligence.

The following describes in detail the foregoing artificial intelligence main framework from two dimensions: an "intelligent information chain" (horizontal axis) and an "information technology (IT) value chain" (vertical axis).

The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, data undergoes a condensation process of "data-information-knowledge-wisdom".

The "IT value chain" reflects a value brought by artificial intelligence to the information technology industry from an underlying infrastructure and information (technology providing and processing implementation) of human intelligence to an industrial ecological process of a system.

(1) Infrastructure

The infrastructure provides calculation capability support for the artificial intelligence system, communicates with an external world, and implements support by using a basic platform.

The infrastructure can communicate with the outside by using a sensor, and a calculation capability of the infrastructure can be provided by an intelligent chip.

The intelligent chip herein may be a hardware acceleration chip such as a central processing unit (CPU), a neural-network processing unit (NPU), a graphics processing unit (GPU), an application-specific integrated circuit (ASIC), or a field programmable gate array (FPGA).

The basic platform of the infrastructure may include related platforms, for example, a distributed computing framework and a network, for assurance and support, including cloud storage and computing, an interconnection network, and the like.

For example, the infrastructure can communicate with the outside by using the sensor, to obtain data. Then, the data is provided to an intelligent chip in a distributed computing system provided by the basic platform, for computing.

(2) Data

Data from a higher layer of the infrastructure indicates a data source in the field of artificial intelligence. The data relates to a graph, an image, voice, and text, further relates to internet of things data of a conventional device and includes service data of an existing system and perception data such as force, displacement, a liquid level, a temperature, and humidity.

(3) Data Processing

The foregoing data processing usually includes a processing manner such as data training, machine learning, deep learning, search, inference, or decision-making.

In machine learning and deep learning, intelligent information of the data may be modeled, extracted, preprocessed, trained, or the like in a symbolized and formalized manner.

Inference is a process of simulating intelligent human inference methods in computers or intelligent systems and using, based on an inference control policy, formalized information to carry out machine thinking and resolve problems, and typical functions are search and matching.

Decision-making is a process of making a decision after intelligent information inference, and usually provides functions such as classification, ranking, and prediction.

(4) General Capability

After data processing mentioned above is performed on data, some general capabilities may be further formed based on a data processing result, for example, an algorithm or a general system, such as translation, text analysis, computer vision processing, speech recognition, and image recognition.

(5) Smart Product and Industry Application

Smart products and industry applications are products and applications of the artificial intelligence system in various fields and are package of an overall solution of the artificial intelligence. Decision-making for intelligent information is productized and an application is implemented. Application fields include smart manufacturing, smart transportation, smart home, smart health care, smart security, autonomous driving, safe city, intelligent terminal, and the like.

The embodiments may be applied to many fields of artificial intelligence, for example, fields such as smart manufacturing, smart transportation, smart home, smart health care, smart security protection, autonomous driving, and a safe city.

The embodiments may be applied to management and retrieval of a cloud multimedia library, or may be applied to management and retrieval of a multimedia library of a terminal, or may be applied to another scenario of managing and retrieving a multimedia library including a large quantity of videos by using a natural language.

The following briefly describes an application scenario of searching for a video clip of interest (in the multimedia library) by using a natural language.

Video Clip Searching:

The multimedia library includes a large quantity of videos. When a user searches for a video clip of interest, a natural language is used for query, so that an interaction manner (of searching for the video clip) can be improved, video management and retrieval by the user are more convenient, and user experience is improved.

When a user stores a large quantity of videos on a terminal device (for example, a mobile phone) or on a cloud, the user may query a video clip of interest by entering a natural language or may manage stored videos by category. This improves user experience.

For example, by using the video processing method in the embodiments, an apparatus (or a model) applicable to video processing can be constructed. When a user wants to search a multimedia library for a video clip about "a baby is eating," the user may enter a natural sentence "a baby is eating." Videos in the multimedia library and the entered natural sentence are input into the foregoing constructed apparatus (or model), to obtain the video clip about "a baby is eating" in the multimedia library, so that searching for a video clip of interest is completed.

Because the embodiments relate to massive application of a neural network, for ease of understanding, the following describes terms and concepts related to the neural network that may be used in the embodiments.

(1) Neural Network

The neural network may include a neuron. The neuron may be an operation unit that uses $x_s$ and an intercept of 1 as input. Output of the operation unit may be as follows:

$$h_{W,b}(x)=f(W^T x)=f(\Sigma_{s=1}^n W_s x_s + b) \qquad (1\text{-}1)$$

Herein, $s=1, 2, \ldots,$ or n, n is a natural number greater than 1, $W_s$ indicates a weight of $x_s$, b indicates a bias of the neuron. f indicates an activation function of the neuron, where the activation function is used for introducing a non-linear characteristic into the neural network, to convert an input signal in the neuron into an output signal. The output signal of the activation function may be used as an input to a next convolutional layer, and the activation function may be a sigmoid function. The neural network is a network constituted by connecting a plurality of single neurons together. An output of a neuron may be an input to another neuron. An input to each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network and may be understood as a neural network having a plurality of hidden layers. The DNN is divided based on positions of different layers. Neural networks inside the DNN may be classified into three types: an input layer, a hidden layer, and an output layer. Generally, a first layer is the input layer, a last layer is the output layer, and a middle layer is the hidden layer. Layers are fully connected. Any neuron in an $i^{th}$ layer may be necessarily connected to any neuron in an $(i+1)^{th}$ layer.

Although the DNN seems complex, the DNN is actually not complex in terms of work at each layer, and is simply indicated as the following linear relationship expression: $\vec{y}=\alpha(W \vec{x}+\vec{b})$, where $\vec{x}$ is an input vector, $\vec{y}$ is an output vector, $\vec{b}$ is a bias vector, W is a weight matrix (which is also referred to as a coefficient), and $\alpha(\ )$ is an activation function. At each layer, the output vector $\vec{x}$ is obtained by performing such a simple operation on the input vector $\vec{y}$. Due to a large quantity of DNN layers, quantities of coefficients W and bias vectors $\vec{b}$ are also large. Definitions of the parameters in the DNN are as follows: The coefficient W is used as an example. It is assumed that in a DNN with three layers, a linear coefficient from a fourth neuron at a second layer to a second neuron at a third layer is defined as $W_{24}^3$. A superscript 3 indicates an ordinal number of a layer at which the coefficient W is located, and a subscript corresponds to an index 2 of the third layer for output and an index 4 of the second layer for input.

In conclusion, a coefficient from a $k^{th}$ neuron at an $(L-1)^{th}$ layer to a $j^{th}$ neuron at an $L^{th}$ layer is defined as $W_{jk}^{L}$.

It should be noted that the input layer has no parameter W. In the deep neural network, more hidden layers allow the network to better describe a complex case in the real world. Theoretically, a model with more parameters has higher complexity and a larger "capacity". It indicates that the model can complete a more complex learning task. Training of the deep neural network is a process of learning a weight matrix, and a final objective of the training is to obtain a weight matrix of all layers of a trained deep neural network (a weight matrix formed by vectors W of many layers).

(3) Convolutional Neural Network

The convolutional neural network (CNN) is a deep neural network with a convolutional structure. The convolutional neural network includes a feature extractor including a convolutional layer and a sub-sampling layer. The feature extractor may be considered as a filter. The convolutional layer is a neuron layer, in a convolutional neural network, that performs convolution processing on an input signal. In the convolutional layer of the convolutional neural network, one neuron may be connected to only a part of neurons in a neighboring layer. A convolutional layer generally includes several feature planes, and each feature plane may include some neurons arranged in a rectangle. Neurons of a same feature plane share a weight, and the shared weight herein is a convolution kernel. Sharing a weight may be understood as that a manner of extracting image information is unrelated to a position. The convolution kernel may be initialized in a form of a matrix of a random size. In a training process of the convolutional neural network, an appropriate weight may be obtained for the convolution kernel through learning. In addition, sharing the weight is advantageous because connections between layers of the convolutional neural network are reduced, and a risk of overfitting is reduced.

(4) A recurrent neural network (RNN) is used for processing sequence data. In a conventional neural network model, from an input layer to a hidden layer and then to an output layer, the layers are fully connected, but nodes in each layer are not connected. This common neural network resolves many problems but is still incompetent to resolve many other problems. For example, to predict a next word in a sentence, a previous word usually needs to be used, because adjacent words in the sentence are not independent. A reason why the RNN is referred to as a recurrent neural network is that a current output of a sequence is related to a previous output. A representation form is that the network memorizes previous information and applies the previous information to calculation of the current output. Nodes in the hidden layer may no longer be unconnected, but connected, and an input for the hidden layer includes not only an output of the input layer but also an output of the hidden layer at a previous moment. Theoretically, the RNN can process sequence data of any length. Training of the RNN is the same as training of a conventional CNN or DNN.

A reason why the recurrent neural network is required when there is the convolutional neural network is simple. In the convolutional neural network, there is a premise that elements are independent of each other, and input and output are also independent, such as a cat and a dog. However, many elements are interconnected in the real world. For example, stocks change over time. For another example, a person says: I like traveling, a most favorite place is Yunnan, and I will go there in the future if there is a chance. If there is a blank to be filled herein, people should know that "Yunnan" is to be filled in. This is because people can make an inference from a context, but how can a machine do this? The RNN emerges. The RNN is designed to enable a machine to have a capability to remember like human beings. Therefore, an output of the RNN depends on current input information and historical memory information.

(5) Loss Function

In a process of training a deep neural network, because it is expected that an output of the deep neural network is as close as possible to a value that is actually expected to be predicted, a predicted value of a current network and a target value that is actually expected may be compared, and then, a weight vector of each layer of the neural network is updated based on a difference between the two (further, there is usually an initialization process before the first update, a parameter may be preconfigured for each layer in the deep neural network). For example, if the predicted value of the network is higher, the weight vector is adjusted to obtain a lower predicted value. The weight vector is continuously adjusted until the deep neural network can predict the target value that is actually expected or a value that is very close to the target value that is actually expected. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value (loss) of the loss function indicates a larger difference. Therefore, training of the deep neural network becomes a process of reducing the loss as much as possible.

(6) Back Propagation Algorithm

In a training process, a neural network may correct values of parameters in an initial neural network model by using an error back propagation (BP) algorithm, so that a reconstruction error loss of the neural network model becomes increasingly smaller. An input signal may be forward transferred until an error loss occurs during output, and the parameters in the initial neural network model are updated based on back propagation error loss information, so that the error loss is reduced. The back propagation algorithm is a back propagation motion dependent on the error loss and is used for obtaining parameters of an optimal neural network model, for example, a weight matrix.

Figure 2:
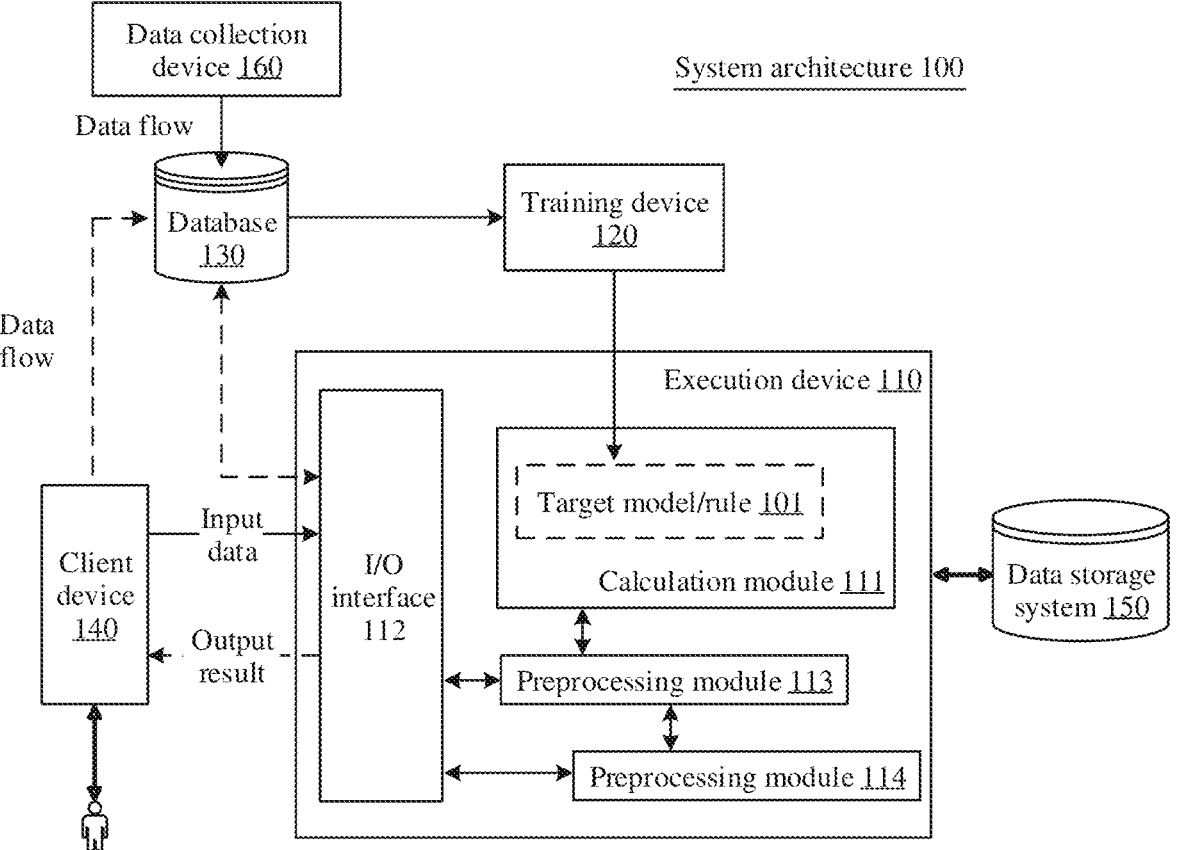
FIG. 2 is a schematic diagram of a structure of a system architecture according to an embodiment.

FIG. 2 shows a system architecture 100 according to an embodiment. In FIG. 2, a data collection device 160 is configured to collect training data. For the video processing method in the embodiments, the training data may include an input sentence, a training video, and a video clip that is in the training video and that has a highest matching degree with the input sentence. The video clip that is in the training video and that has the highest matching degree with the input sentence may be a manually pre-labeled video clip.

After collecting the training data, the data collection device 160 stores the training data in a database 130. A training device 120 obtains a target model/rule 101 through training based on the training data maintained in the database 130.

The following describes how the training device 120 obtains the target model/rule 101 based on the training data. The training device 120 processes the training video based on the input sentence, and compares an output video clip with the video clip that is in the training video and that has the highest matching degree with the input sentence, until a difference between the video output by the training device 120 and the video clip that is in the training video and that has the highest matching degree with the input sentence is less than a threshold, to complete training of the target model/rule 101.

The target model/rule 101 can be used for implementing a video processing method in the embodiments. The target model/rule 101 in this embodiment may be a video processing apparatus (or model) in the embodiments, and the video processing apparatus (or model) may include a plurality of neural networks. It should be noted that, during actual application, the training data maintained in the database 130 may not all be collected by the data collection device 160 or may be received and obtained from another device. It should be further noted that the training device 120 may not necessarily train the target model/rule 101 completely based on the training data maintained in the database 130 or may obtain training data from a cloud or another place to perform model training. The foregoing description should not be construed as a limitation on the embodiments.

The target model/rule 101 obtained through training by the training device 120 may be applied to different systems or devices, for example, an execution device 110 shown in FIG. 2. The execution device 110 may be a terminal, for example, a mobile phone terminal, a tablet computer, a laptop computer, an augmented reality (AR)/virtual reality (VR) terminal, or a vehicle-mounted terminal, or may be a server, a cloud, or the like. In FIG. 2, the execution device 110 is provided with an input/output (I/O) interface 112, configured to exchange data with an external device. A user may input data to the I/O interface 112 by using a client device 140. The input data in this embodiment may include a video input by the client device and an input sentence.

A preprocessing module 113 and a preprocessing module 114 are configured to perform preprocessing based on the input data (for example, the input video and the input sentence) received through the I/O interface 112. In this embodiment, the preprocessing module 113 and the preprocessing module 114 may not exist (or only one of the preprocessing module 113 and the preprocessing module 114 exists), and the input data is processed directly by using a calculation module 111.

In a related process in which the execution device 110 preprocesses the input data or the calculation module 111 of the execution device 110 performs calculation, the execution device 110 may invoke data, code, and the like in the data storage system 150 for corresponding processing, and may also store data, instructions, and the like obtained through corresponding processing into the data storage system 150.

Finally, the I/O interface 112 returns a processing result, for example, the foregoing obtained video clip, to the client device 140, to provide the video clip for the user.

It should be noted that the training device 120 may generate corresponding target models/rules 101 for different targets or different tasks based on different training data. The corresponding target models/rules 101 may be used for implementing the foregoing targets or complete the foregoing tasks, to provide a required result for the user.

In a case shown in FIG. 2, the user may manually give input data, and the manual giving may be performed in an interface provided by the I/O interface 112. In another case, the client device 140 may automatically send the input data to the I/O interface 112. If it is required that the client device 140 needs to obtain authorization from the user to automatically send the input data, the user may set corresponding permission on the client device 140. The user may check, on the client device 140, a result output by the execution device

110. The result may be presented in a form of display, a sound, an action, or the like. The client device 140 may also serve as a data collector to collect, as new sample data, the input data that is input to the I/O interface 112 and an output result that is output from the I/O interface 112 shown in the figure and store the new sample data in the database 130. Also, the client device 140 may alternatively not perform collection. Instead, the I/O interface 112 directly stores, in the database 130 as new sample data, the input data that is input to the I/O interface 112 and the output result that is output from the I/O interface 112 in the figure.

It should be noted that FIG. 2 is merely a schematic diagram of a system architecture according to an embodiment. A location relationship between the devices, the components, the modules, and the like shown in the figure does not constitute any limitation. For example, in FIG. 2, the data storage system 150 is an external memory relative to the execution device 110, but in another case, the data storage system 150 may alternatively be disposed in the execution device 110.

As shown in FIG. 2, the target model/rule 101 is obtained through training by the training device 120. In this embodiment, the target model/rule 101 may be the video processing apparatus (or model). The video processing apparatus (or model) may include a plurality of neural networks. The video processing apparatus (or model) may include a CNN, a deep convolutional neural network (DCNN), a recurrent neural network (RNN), and the like.

Because the CNN is a very common neural network, a structure of the CNN is described below in detail with reference to FIG. 3. As described in the foregoing description of basic concepts, the convolutional neural network is a deep neural network with a convolutional structure and is a deep learning architecture. The deep learning architecture is to perform multi-level learning at different abstract levels by using a machine learning algorithm. As a deep learning architecture, the CNN is a feed-forward artificial neural network, and each neuron in the feed-forward artificial neural network can respond to an image input into the feed-forward artificial neural network.

Figure 3:
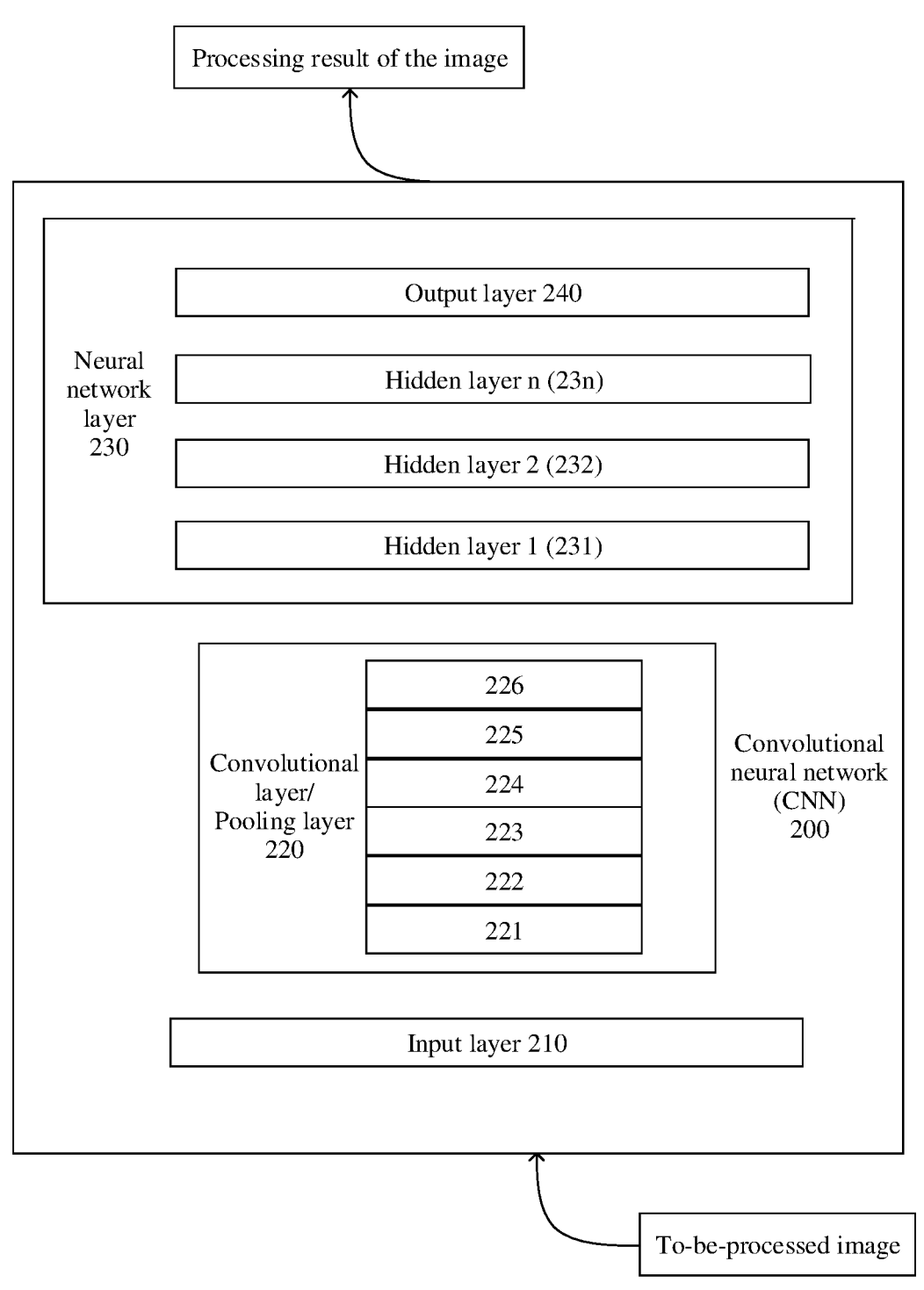
FIG. 3 is a schematic diagram of a structure of a convolutional neural network according to an embodiment.

A structure of a convolutional neural network used in the embodiments may be shown in FIG. 3. In FIG. 3, a convolutional neural network (CNN) 200 may include an input layer 210, a convolutional layer/pooling layer 220 (the pooling layer is optional), and a neural network layer 230.

In the embodiments, a video frame may be considered as an image. Therefore, image processing is used as an example to describe the structure of the convolutional neural network. For example, the input layer 210 may obtain a to-be-processed image and send the obtained to-be-processed image to the convolutional layer/pooling layer 220 and the subsequent neural network layer 230 for processing, to obtain a processing result of the image. The following describes in detail an architecture of the layer in the CNN 200 in FIG. 3.

Convolutional Layer/Pooling Layer 220:

Convolutional Layer:

As shown in FIG. 3, the convolutional layer/pooling layer 220 may include, for example, layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer; and in another implementation, the layers 221 and 222 are convolutional layers, the 223 layer is a pooling layer, the layers 224 and 225 are convolutional layers, and the layer 226 is a pooling layer. In other words, output of a convolutional layer may be used as input for a subsequent pooling layer or may be used as input for another convolutional layer, to continue to perform a convolution operation.

The following describes internal working principles of the convolutional layer by using the convolutional layer 221 as an example.

The convolutional layer 221 may include a plurality of convolution operators. The convolution operator is also referred to as a kernel. In image processing, the convolution operator functions as a filter that extracts information from an input image matrix. The convolution operator may essentially be a weight matrix, and the weight matrix is usually predefined. In a process of performing a convolution operation on an image, the weight matrix usually processes pixels at a granularity level of one pixel (or two pixels, depending on a value of a stride) in a horizontal direction on an input image, to extract a feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows×columns), namely, a plurality of same-type matrices, are applied. Outputs of the weight matrices are superimposed to form a depth dimension of a convolutional image. The dimension herein may be understood as being determined based on the foregoing "plurality". Different weight matrices may be used for extracting different features from the image. For example, one weight matrix is used for extracting edge information of the image, another weight matrix is used for extracting a color of the image, and a further weight matrix is used for blurring unneeded noise in the image. The weight matrices have the same size (rows×columns), and convolutional feature maps extracted from the plurality of weight matrices with the same size have a same size. Then, the plurality of extracted convolutional feature maps with the same size are combined to form output of the convolution operation.

Weight values in these weight matrices need to be obtained through a lot of training during actual application. Each weight matrix formed by using the weight values obtained through training may be used for extracting information from an input image, to enable the convolutional neural network 200 to perform correct prediction.

When the convolutional neural network 200 has a plurality of convolutional layers, an initial convolutional layer (for example, the layer 221) usually extracts more general features, where the general features may also be referred to as low-level features. As a depth of the convolutional neural network 200 increases, a deeper convolutional layer (for example, the layer 226) extracts more complex features, such as high-level semantic features. A feature with higher semantics is more applicable to a to-be-resolved problem.

Pooling Layer:

Because a quantity of training parameters usually needs to be reduced, a pooling layer usually needs to be periodically introduced after a convolutional layer. For the layers 221 to 226 in the layer 220 shown in FIG. 3, one convolutional layer may be followed by one pooling layer, or a plurality of convolutional layers may be followed by one or more pooling layers. During image processing, the pooling layer is only used for reducing a space size of the image. The pooling layer may include an average pooling operator and/or a maximum pooling operator, to perform sampling on the input image to obtain an image with a relatively small size. The average pooling operator may be used for calculating pixel values in the image in a range, to generate an average value. The average value is used as an average pooling result. The maximum pooling operator may be used for selecting a pixel with the largest value in a range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer indicates an average value or a maximum value of a corresponding sub-region of the image input to the pooling layer.

Neural Network Layer 230:

After processing is performed by the convolutional layer/pooling layer 220, the convolutional neural network 200 still cannot output required output information. As described above, at the convolutional layer/pooling layer 220, only a feature is extracted, and parameters resulting from an input image are reduced. However, to generate final output information (required class information or other related information), the convolutional neural network 200 needs to use the neural network layer 230 to generate output of one required class or outputs of a quantity of a group of required classes. Therefore, the neural network layer 230 may include a plurality of hidden layers (231, 232, . . . , and 23n shown in FIG. 3) and an output layer 240. Parameters included in the plurality of hidden layers may be obtained through pre-training based on related training data of a task type. For example, the task type may include image recognition, image classification, super-resolution image reconstruction, and the like.

At the neural network layer 230, the hidden layers are followed by the output layer 240, namely, the last layer of the entire convolutional neural network 200. The output layer 240 has a loss function similar to a categorical cross entropy, and the loss function is configured to calculate a prediction error. Once forward propagation (for example, propagation in a direction from 210 to 240 in FIG. 3) of the entire convolutional neural network 200 is completed, back propagation (for example, propagation in a direction from 240 to 210 in FIG. 3) is started to update a weight value and a deviation of each layer mentioned above, to reduce a loss of the convolutional neural network 200 and an error between a result output by the convolutional neural network 200 by using the output layer and an ideal result.

Figure 4:
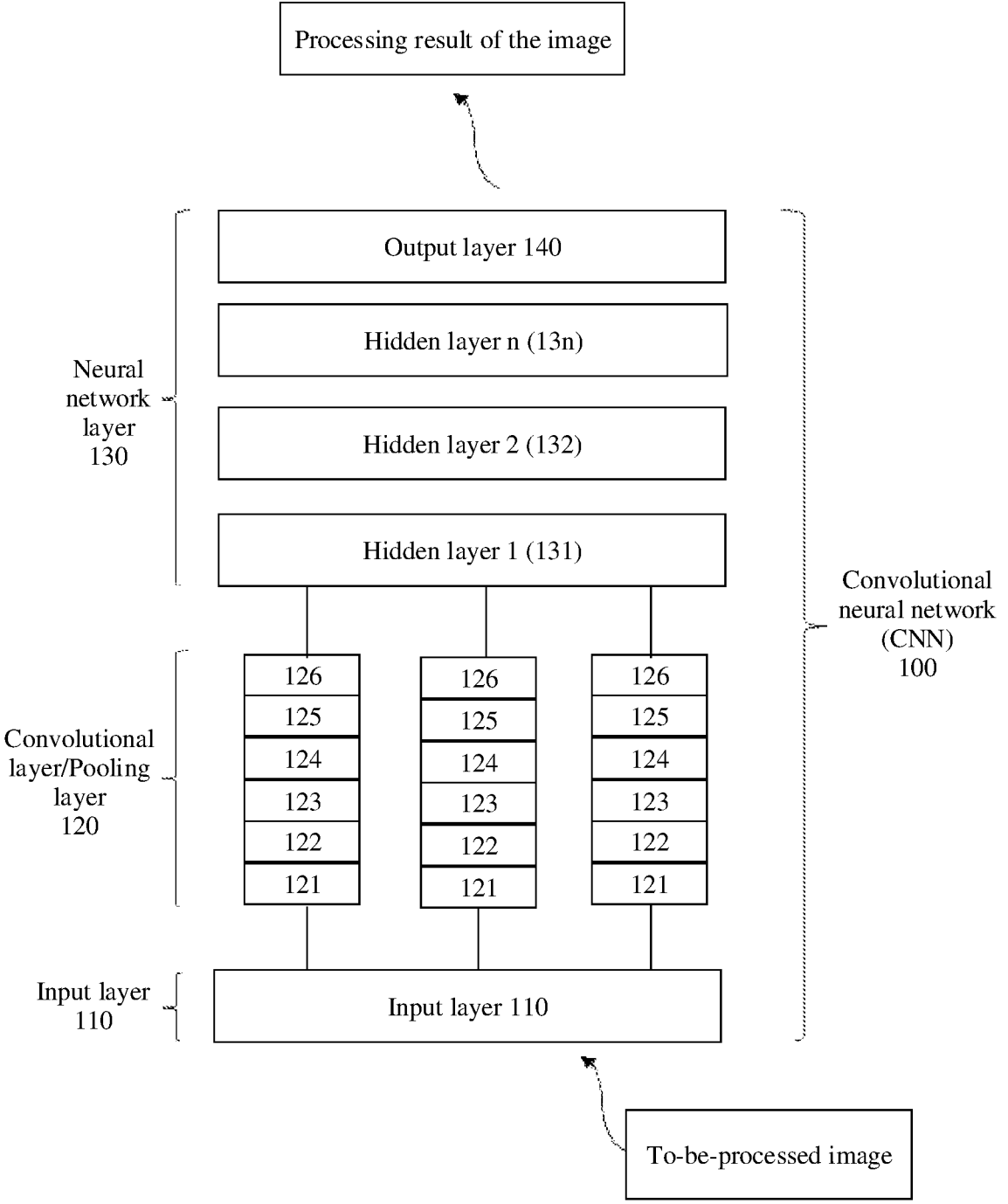
FIG. 4 is a schematic diagram of a structure of another convolutional neural network according to an embodiment.

A structure of a convolutional neural network used in the embodiments may be shown in FIG. 4. In FIG. 4, a convolutional neural network (CNN) 200 may include an input layer 110, a convolutional layer/pooling layer 120 (the pooling layer is optional), and a neural network layer 130. Compared with FIG. 3, in FIG. 4, at the convolutional layer/pooling layer 120, a plurality of convolutional layers/pooling layers are in parallel, and extracted features are input to the neural network layer 130 for processing.

It should be noted that the convolutional neural network shown in FIG. 3 and the convolutional neural network shown in FIG. 4 are merely examples of two possible convolutional neural networks used in the embodiments. The convolutional neural network used in the embodiments may alternatively exist in a form of another network model.

Figure 5:
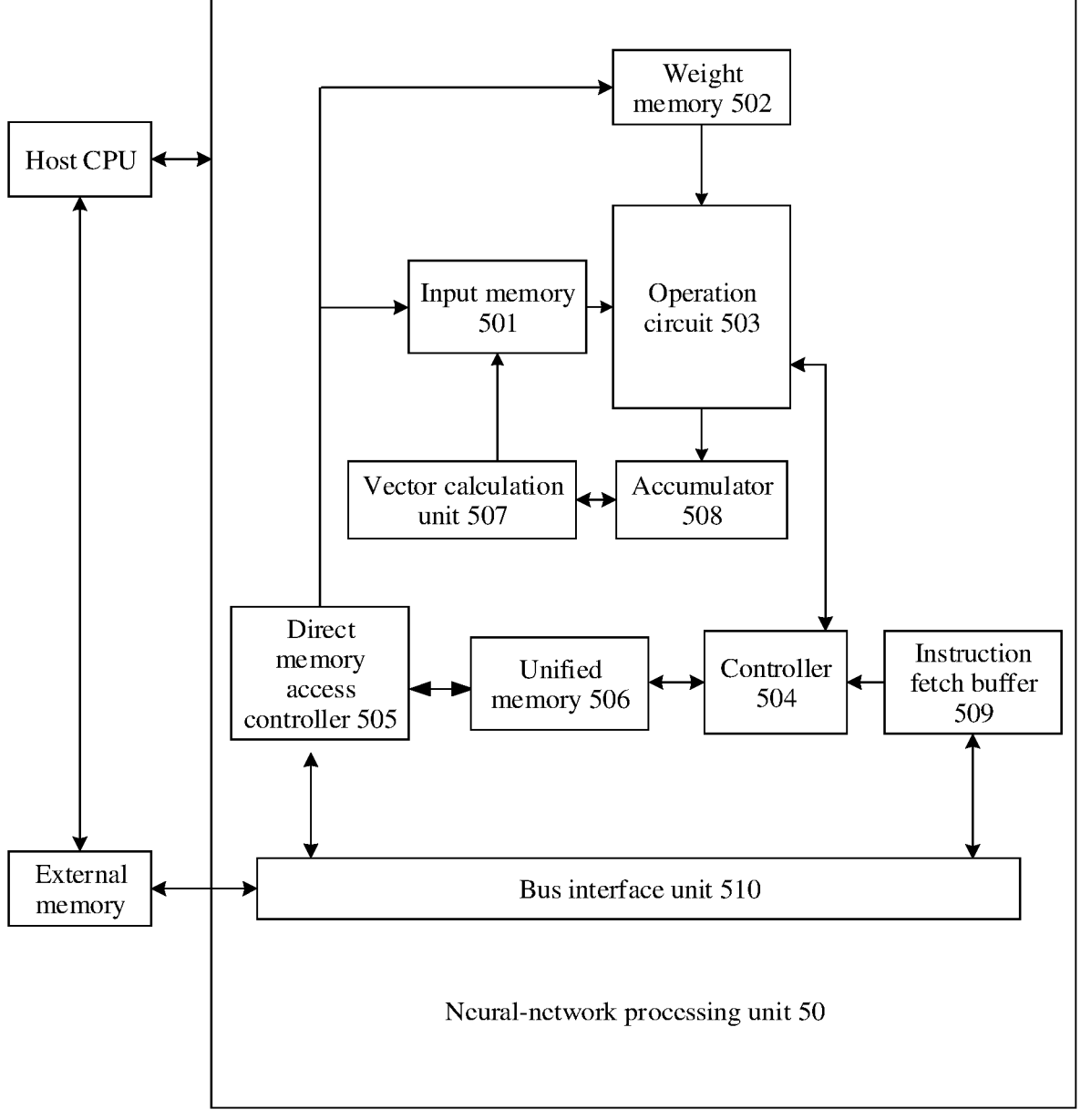
FIG. 5 is a schematic diagram of a hardware structure of a chip according to an embodiment.

FIG. 5 is a schematic diagram of a hardware architecture of a chip according to an embodiment. The chip includes a neural-network processing unit 50. The chip may be disposed in the execution device 110 shown in FIG. 1, to complete calculation work of the calculation module 111. The chip may alternatively be disposed in the training device 120 shown in FIG. 1, to complete training work of the training device 120 and output the target model/rule 101. Algorithms at all layers of the convolutional neural network shown in FIG. 3 and the convolutional neural network shown in FIG. 4 may be implemented in the chip shown in FIG. 5.

The neural-network processing unit NPU 50 is mounted to a host central processing unit (CPU)) as a coprocessor, and the host CPU assigns a task. A core part of the NPU is an operation circuit 503, and a controller 504 controls the operation circuit 503 to extract data from a memory (a weight memory or an input memory) and perform an operation.

In some implementations, the operation circuit 503 internally includes a plurality of processing engines (PEs). In some implementations, the operation circuit 503 is a two-dimensional systolic array. Alternatively, the operation circuit 503 may be a one-dimensional systolic array or another electronic circuit that can perform mathematical operations such as multiplication and addition. In some implementations, the operation circuit 503 is a general-purpose matrix processor.

For example, it is assumed that there are an input matrix A, a weight matrix B, and an output matrix C. The operation circuit extracts corresponding data of the matrix B from the weight memory 502 and buffers the corresponding data into each PE in the operation circuit. The operation circuit extracts data of the matrix A from the input memory 501, performs a matrix operation between the data of the matrix A and the matrix B to obtain a partial matrix result or a final matrix result, and stores the result into an accumulator 508.

A vector calculation unit 507 may perform further processing on the output of the operation circuit, for example, perform vector multiplication, vector addition, an exponential operation, a logarithmic operation, and value comparison. For example, the vector calculation unit 507 may be configured to perform network calculation, such as pooling, batch normalization, or local response normalization at a non-convolutional/non-FC layer in a neural network.

In some implementations, the vector calculation unit 507 can store a processed output vector in a unified memory 506. For example, the vector calculation unit 507 may apply a non-linear function to the output, for example, a vector of an accumulated value, of the operation circuit 503 to generate an activation value. In some implementations, the vector calculation unit 507 generates a normalized value, a combined value, or both. In some implementations, the processed output vector can be used as an activation input to the operation circuit 503, for example, used in a subsequent layer in the neural network.

The unified memory 506 is configured to store input data and output data.

A direct memory access controller (DMAC) 505 transfers input data in an external memory to the input memory 501 and/or the unified memory 506, stores, in the weight memory 502, weight data in the external memory, and stores, in the external memory, data in the unified memory 506.

A bus interface unit (BIU) 510 is configured to implement interaction between the host CPU, the DMAC, and an instruction fetch buffer 509 by using a bus.

The instruction fetch buffer 509 connected to the controller 504 is configured to store instructions used by the controller 504.

The controller 504 is configured to invoke the instructions buffered in the instruction fetch buffer 509, to control a working process of the operation accelerator.

Usually, the unified memory 506, the input memory 501, the weight memory 502, and the instruction fetch buffer 509 each are an on-chip memory. The external memory is a memory outside the NPU. The external memory may be a double data rate synchronous dynamic random access memory (DDR SDRAM), a high bandwidth memory (HBM), or another readable and writable memory.

An operation of each layer in the convolutional neural network shown in FIG. 3 and the convolutional neural network FIG. 4 may be performed by the operation circuit 503 or the vector calculation unit 507.

The execution device 110 in FIG. 2 can perform steps of the video processing method in the embodiments. The CNN model shown in FIG. 3 and the CNN model shown in FIG. 4 and the chip shown in FIG. 5 may also be configured to perform the steps of the video processing method in the embodiments. The following describes in detail the video processing method in the embodiments with reference to the accompanying drawings.

Figure 6:
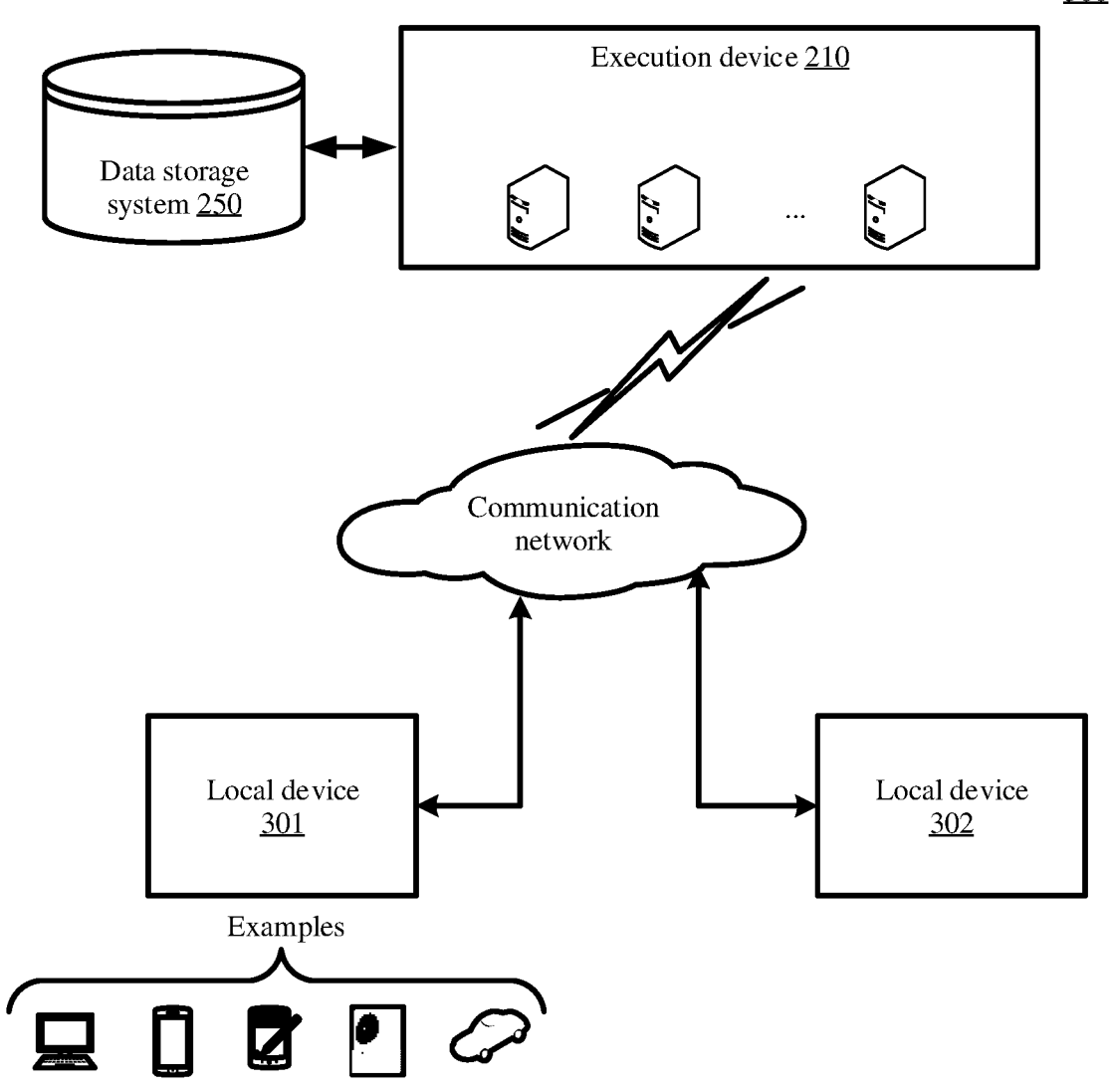
FIG. 6 is a schematic diagram of a system architecture according to an embodiment.

FIG. 6 shows a system architecture 300 according to an embodiment. The system architecture includes a local device 301, a local device 302, an execution device 210, and a data storage system 250. The local device 301 and the local device 302 are connected to the execution device 210 by using a communication network.

The execution device 210 may be implemented by one or more servers. Optionally, the execution device 210 may cooperate with another computing device, for example, a device such as a data memory, a router, or a load balancer. The execution device 210 may be disposed on one physical site or distributed on a plurality of physical sites. The execution device 210 may implement the video processing method in this embodiment by using data in the data storage system 250 or by invoking program code in the data storage system 250.

The execution device 210 may perform the following process: obtaining a semantic feature of an input sentence; performing semantic enhancement on a video frame based on the semantic feature, to obtain a video feature of the video frame, where the video feature includes the semantic feature; and determining, based on the semantic feature and the video feature, whether a video clip to which the video frame belongs is a target video clip corresponding to the input sentence.

Through the foregoing process, the execution device 210 can be set up as a video processing apparatus (or model). The video processing apparatus (or model) may include one or more neural networks. The video processing apparatus (or model) may be configured to search for or locate a video clip, retrieve, or manage a multimedia library, and the like.

A user may operate respective user equipment (for example, the local device 301 and the local device 302) to interact with the execution device 210. Each local device may be any computing device, such as a personal computer, a computer workstation, a smartphone, a tablet computer, an intelligent camera, a smart automobile, another type of cellular phone, a media consumption device, a wearable device, a set-top box, or a game console.

A local device of each user may interact with the execution device 210 through a communication network of any communication mechanism/communication standard. The communication network may be a wide area network, a local area network, a point-to-point connection, or any combination thereof.

In an implementation, the local device 301 and the local device 302 obtain a related parameter of the video processing apparatus (or model) from the execution device 210, deploy the video processing apparatus (or model) on the local device 301 and the local device 302, and use the video processing apparatus (or model) to search or locate a video clip, retrieve or manage a multimedia library, and the like.

In another implementation, the video processing apparatus (or model) may be directly deployed on the execution device 210. The execution device 210 obtains an input video and an input sentence from the local device 301 and the local device 302, and performs searching or locating of a video clip, retrieve or management of multimedia, and the like by using the video processing apparatus (or model).

Alternatively, the execution device 210 may be a cloud device. In this case, the execution device 210 may be deployed on a cloud. Alternatively, the execution device 210 may be a terminal device, and in this case, the execution device 210 may be deployed on a user terminal side. This is not limited in this embodiment.

A video frame sequence may include video frames, and each video frame may also be considered as a picture or an image. In other words, the video may also be considered as a picture sequence including pictures, or an image sequence including images.

A video may also be divided into one or more video clips, and each video clip includes one or more video frames. For example, the video may be divided into a plurality of video clips based on content in the video, or the video may be divided into a plurality of video clips based on time coordinates in the video. In this embodiment, a method for dividing a video into video clips is not limited.

The following describes in detail the solutions in the embodiments with reference to the accompanying drawings.

FIG. 7 is a schematic flowchart of a video processing method. The video processing method 700 may include S710, S720, and S730. In some examples, the video processing method may be performed by a device such as the execution device 110 in FIG. 2, the chip shown in FIG. 5, and the execution device 210 in FIG. 6.

S710: Obtain a semantic feature of an input sentence.

Optionally, the semantic feature (or semantic information) of the input sentence may be obtained by using a neural network.

The semantic feature of the input sentence may be a feature vector of the input sentence, and the feature vector of the input sentence may indicate the input sentence. In other words, the semantic feature of the input sentence may alternatively be considered as an expression in a vector form of the input sentence.

For example, the semantic feature of the input sentence may be obtained by using a recurrent neural network (RNN). Alternatively, the semantic feature of the input sentence may be obtained by using another neural network. This is not limited in this embodiment.

Optionally, a semantic feature of each word (or individual word) in the input sentence may be obtained by using a neural network.

Correspondingly, the input sentence may be represented as a semantic feature sequence including semantic features of words in the input sentence.

For example, if the input sentence includes k words (or individual words), and semantic features of the k words in the input sentence are obtained by using the neural network. In this case, a semantic feature sequence $\{w_1, w_2, \ldots, w_k\}$ including the semantic features of the k words may indicate the semantic feature of the input sentence. $w_i$ indicates a semantic feature of an $i^{th}$ word in the input sentence, i is a positive integer less than k, and k is a positive integer.

S720: Perform semantic enhancement on a video frame based on the semantic feature, to obtain a video feature of the video frame.

The video feature includes the semantic feature. Alternatively, in other words, the video feature includes a semantic meaning corresponding to the input sentence, or the video feature carries a semantic meaning corresponding to the input sentence.

Optionally, in this embodiment, a word corresponding to the video frame in the input sentence may be first determined. Semantic enhancement is performed on the video frame based on a semantic feature of the word corresponding to the video frame to obtain the video feature of the video frame.

The word corresponding to the video frame in the input sentence may be considered as a word that is in the input sentence and that is most relevant to content corresponding to the video frame. Alternatively, it may be considered that, in a plurality of words included in the input sentence, a semantic meaning corresponding to the word is most relevant to content corresponding to the video frame.

In this embodiment, semantic enhancement is performed on the video frame by using a semantic feature of a word most relevant to the video frame in the input sentence, so that the video feature of the video frame can be more accurate. In this case, the target video clip corresponding to the input sentence is recognized based on the video feature, so that accuracy of recognizing the target video clip corresponding to the input sentence can be improved.

A method for determining the word corresponding to the video frame in the input sentence may be shown in the following embodiment in FIG. 8, and details are not described herein again.

It should be noted that the semantic enhancement in S720 may refer to collaboratively constructing the video feature of the video frame based on the semantic feature or fusing the semantic feature (or may be understood as the semantic meaning corresponding to the input sentence) into the video feature of the video frame.

Optionally, in this embodiment, semantic enhancement may be performed on the video frame based on the semantic feature in the following several manners.

Manner 1:

In this embodiment, when the video feature of the video frame is extracted, semantic enhancement may be performed on the video frame based on the semantic feature, to directly obtain a semantic-enhanced video feature (of the video frame).

Optionally, the performing semantic enhancement on a video frame based on the semantic feature, to obtain a video feature of the video frame in the video may include: performing feature extraction on the video frame based on the semantic feature, to obtain the video feature of the video frame.

Usually, the video feature of the video frame is extracted by using a pre-trained neural network. According to the method in this embodiment, the semantic feature may be fused into the neural network. During neural network training, the video feature of the video frame is extracted based on the semantic feature.

After the neural network training is completed, when the video feature of the video frame is extracted, semantic enhancement may be performed on the video frame based on the semantic feature. In other words, feature extraction is performed on the video frame based on the semantic feature, to obtain the video feature of the video frame.

In this case, the video feature obtained through feature extraction on the video frame includes the semantic meaning corresponding to the input sentence (or the semantic meaning of the word corresponding to the video frame in the input sentence). Alternatively, the video feature carries the semantic meaning corresponding to the input sentence (or the semantic meaning of the word corresponding to the video frame in the input sentence).

In the manner 1, feature extraction is performed on the video frame based on the semantic feature of the input sentence, and semantic enhancement may be directly performed on the video feature of the video frame in a feature extraction process. This helps improve efficiency of recognizing the target video clip corresponding to the input sentence.

Manner 2:

In this embodiment, an initial video feature of the video frame may alternatively be first obtained, and then semantic enhancement is performed on the initial video feature of the video frame based on the semantic feature, to obtain a semantic-enhanced video feature (of the video frame).

Optionally, before S720, the method 700 may further include S722.

S722: Obtain the initial video feature of the video frame.

The initial video feature of the video frame may be a feature vector of the video frame, and the feature vector of the video frame may indicate the video frame. In other words, the initial video feature of the video frame may alternatively be considered as an expression in a vector form of the video frame.

In this case, the performing semantic enhancement on a video frame based on the semantic feature, to obtain a video feature of the video frame may include: performing semantic enhancement on the initial video feature based on the semantic feature to obtain the video feature of the video frame.

For example, a convolution kernel may be determined based on the semantic feature. Convolution processing is performed on the initial video feature by using the convolution kernel, to fuse the semantic meaning corresponding to the input sentence into the video feature of the video frame to implement semantic enhancement on the video frame.

A method for performing convolution processing on the initial video feature based on the semantic feature may be shown in the following embodiment in FIG. 8, and details are not described herein again.

In this case, the video feature obtained through semantic enhancement on the initial video feature includes the semantic meaning corresponding to the input sentence (or the semantic meaning of the word corresponding to the video frame in the input sentence). Alternatively, the video feature carries the semantic meaning corresponding to the input sentence (or the semantic meaning of the word corresponding to the video frame in the input sentence).

S730: Determine, based on the semantic feature and the video feature, whether a video clip to which the video frame belongs is a target video clip corresponding to the input sentence.

The target video clip corresponding to the input sentence is the target video clip (or the video frame in the target video clip) including content described by the input sentence.

In this embodiment, semantic enhancement is performed on the video frame based on the semantic feature, to obtain the video feature of the video frame, and a semantic meaning corresponding to the input sentence may be fused into the video feature of the video frame. In this case, the target video clip corresponding to the input sentence is recognized based on the semantic feature and the video feature, so that accuracy of recognizing the target video clip corresponding to the input sentence can be improved.

Optionally, the video feature of the video clip to which the video frame belongs may be determined based on the video feature, and a matching degree (or similarity) between the semantic feature and the video feature of the video clip. Whether the video clip to which the video frame belongs is the target video clip corresponding to the input sentence is determined based on the matching degree.

For example, one video may be divided into a plurality of video clips. One video clip may include one or more video frames. A video feature of the video clip is determined based on video features of the video frames in the video clip. Subsequently, a matching degree (or a similarity) between a semantic feature of an input sentence and a video feature of each video clip in the video is calculated, so that a corresponding video clip with a largest matching degree (namely, a value of the matching degree) is a target video clip corresponding to the input sentence.

Optionally, a Euclidean distance between the semantic feature of the input sentence and the video feature of the video clip may be calculated, and a matching degree between the semantic feature of the input sentence and the video feature of the video clip is determined based on the Euclidean distance obtained through calculation.

Alternatively, a matching degree between the semantic feature of the input sentence and the video feature of the video clip may be calculated by using the RNN.

Optionally, before S730, the method 700 may further include S732.

S732: Perform feature fusion on the video feature of the video frame by using a video feature of at least one other video frame to obtain a fused video feature of the video frame.

The at least one other video frame and the video frame belong to the same video.

In this embodiment, feature fusion is performed on the video feature of the video frame by using the video feature of the at least one other video frame in the video, and context information in the video is fused into the video feature of the video frame, so that the video feature of the video frame can be more accurate. In this case, the target video clip corresponding to the input sentence is recognized based on the video feature, so that accuracy of recognizing the target video clip corresponding to the input sentence can be improved.

For example, the video feature of the at least one other video frame may be added to the video feature of the video frame to obtain the fused video feature of the video frame.

In this case, it may be considered that the fused video feature of the video frame is fused with the video feature of the at least one other video frame.

In this embodiment, feature fusion may alternatively be performed on the video feature of the video frame by using video features of all video frames in the video other than the video frame to obtain the fused video feature of the video frame.

Alternatively, feature fusion may be performed on the video feature of the video frame by using video features of all video frames (including the video frame) in the video, to obtain the fused video feature of the video frame.

For example, an average value of video features of all video frames (including the video frame) in the video may be calculated, and the average value is added to the video feature of the video frame to obtain the fused video feature of the video frames.

For another example, the video includes t video frames in total, and video features of the t video frames may form a video feature sequence $\{f_1, f_2, \ldots, f_t\}$ of the video. $f_j$ indicates a semantic feature of a $j^{th}$ word in the input sentence, j is a positive integer less than t, and t is a positive integer. The video features in the video feature sequence $\{f_1, f_2, \ldots, f_t\}$ are multiplied (matrix multiplication) in pairs to obtain a matrix B (where the matrix B may be referred to as a correlation matrix, and an element in the matrix B may be referred to as a correlation feature). A correlation feature is selected for a video frame $f_j$ in the video from the matrix B, the correlation feature is added to a video feature of the video frame $f_j$ in the video to obtain a fused video feature of the video frame $f_j$ in the video.

In this case, it may be considered that the fused video feature of the video frame is fused with video features of all the video frames in the video.

Correspondingly, in S730, whether the video clip to which the video frame belongs is the target video clip corresponding to the input sentence may be determined based on the semantic feature and the fused video feature.

Optionally, the determining, based on the semantic feature and the video feature, whether a video clip to which the video frame belongs is a target video clip corresponding to the input sentence may include:

determining, based on the video feature, a hierarchical structure of the video clip in time domain; and determining, based on the semantic feature and the hierarchical structure, whether the video clip is the target video clip corresponding to the input sentence.

It should be noted that the video feature may be the fused video feature of the video frame obtained in S732. The hierarchical structure of the video clip in the time domain may be determined based on the fused video feature of the video frame.

Optionally, the hierarchical structure of the video clip in the time domain may be determined based on the video feature by using one-dimensional dilated convolution (dilated convolution) or one-dimensional convolution.

In this embodiment, the hierarchical structure of the video clip in the time domain is determined by using the video feature, so that a receptive field of each video frame in the video clip is expanded, and a size of a video feature of each video frame is maintained. In this case, the target video clip corresponding to the input sentence is recognized based on the semantic feature and the hierarchical structure, so that accuracy of recognizing the target video clip corresponding to the input sentence can be improved.

Figure 8:
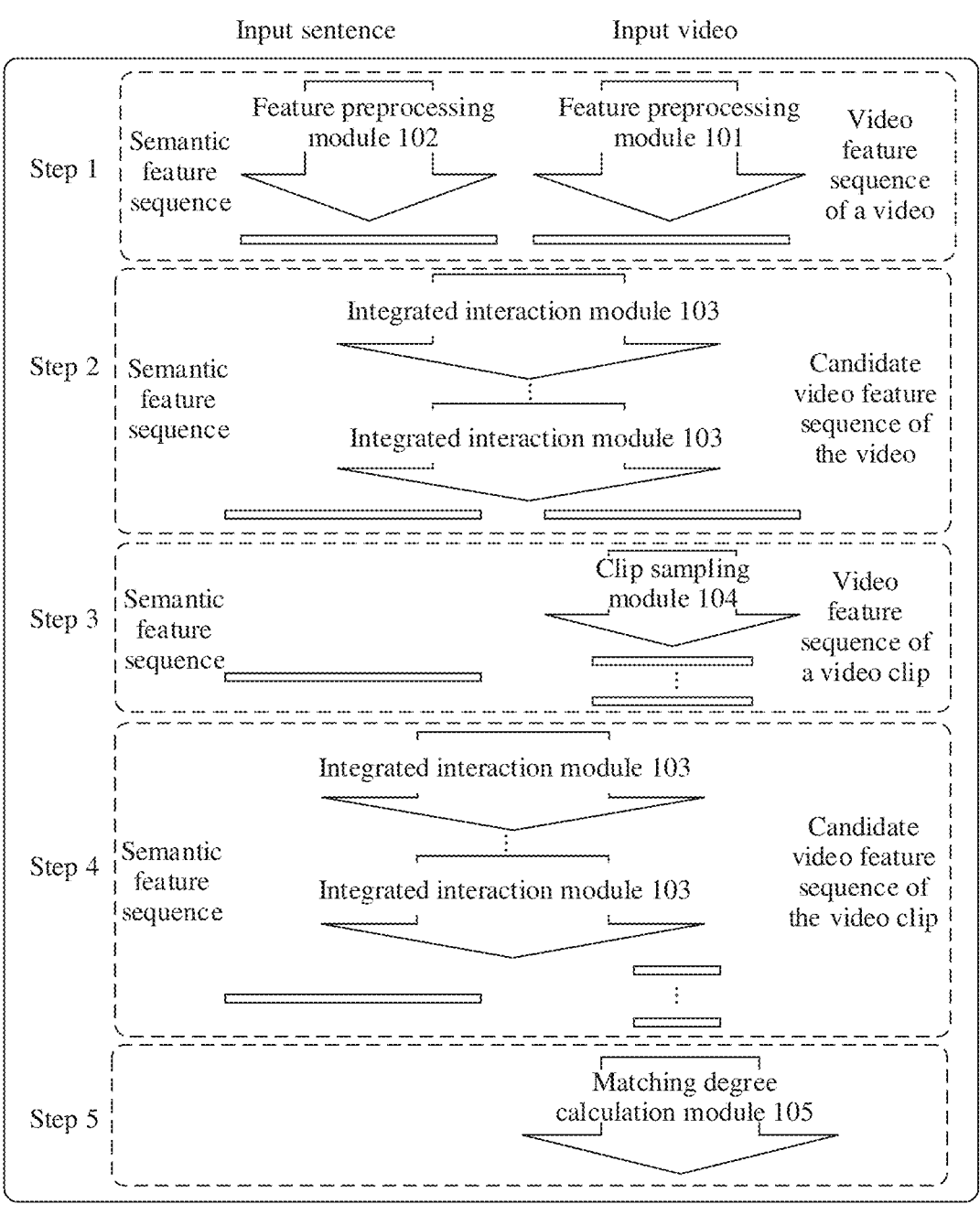
FIG. 8 is a schematic flowchart of a video processing method according to another embodiment.

FIG. 8 is a schematic flowchart of a video processing method. The video processing method 800 may be executed by a video processing apparatus. The apparatus may include a feature preprocessing module 101, a feature preprocessing module 102, an integrated interaction module 103, a clip sampling module 104, and a matching degree calculation module 105. In some examples, the video processing apparatus may be a device such as the execution device 110 in FIG. 2, the chip shown in FIG. 5, or the execution device 210 in FIG. 6.

Step 1:

As shown in FIG. 8, the feature preprocessing module 101 performs preprocessing and feature extraction on an input video, to obtain a video feature sequence of the video. The feature preprocessing module 102 performs preprocessing and feature extraction on an input sentence, to obtain a semantic feature sequence of the input sentence.

The feature preprocessing module 101 may perform feature extraction on a video frame in the input video by using a neural network, to obtain a video feature of the video frame.

Because the video feature is in a vector form, the process may also be considered as encoding the video frame in the video into a vector by using the neural network.

For example, feature extraction may be performed on each video frame in the input video by using a convolutional neural network (CNN), to obtain a video feature of each video frame.

After processing by the feature preprocessing module 101, the video may be represented by a video feature sequence $\{f_1, f_2, \ldots, f_t\}$, where $f_j$ indicates a video feature of a $j^{th}$ video frame in the video, j is a positive integer less than t, and t is a positive integer.

Similarly, the feature preprocessing module 102 may perform feature extraction on a word in the input sentence by using the neural network, to obtain a semantic feature of the word in the input sentence.

Because the semantic feature is in a vector form, the process may also be considered as encoding the word of the input sentence into a vector by using the neural network.

For example, feature extraction may be performed on each word in the input sentence by using a bidirectional long-short term memory (LSTM) recurrent neural network, to obtain a semantic feature of each word.

Particularly, feature extraction is performed by using an LSTM, so that the obtained semantic feature of the word can obtain context information of another word (before or after the word) in the input sentence.

After processing by the feature preprocessing module 102, the input sentence may be represented by a semantic feature sequence $\{w_1, w_2, \ldots, w_k\}$, where $w_i$ indicates a semantic feature of an $i^{th}$ word in the input sentence, i is a positive integer less than k, and k is a positive integer.

Step 2:

As shown in FIG. 8, the integrated interaction module 103 performs, based on the semantic feature sequence of the input sentence, integrated interaction processing on the video feature sequence of the video, to obtain a candidate video feature sequence of the video.

The integrated interaction module 103 may be divided into a semantic enhancing submodule 1031, a context interaction submodule 1032, and a time domain structure construction submodule 1033. It should be noted that these submodules may be actual submodules or may be virtual modules divided based on functions. This is not limited in this embodiment.

(1) Semantic Enhancing Submodule 1031

The semantic enhancement submodule 1031 may perform semantic enhancement on the video frame in the video based on the semantic feature of the input sentence.

For example, matrix multiplication may be performed on the video feature sequence $\{f_1, f_2, \ldots, f_t\}$ of the video and the semantic feature sequence $\{w_1, w_2, \ldots, w_k\}$ of the input sentence, to obtain a matrix A between the two sequences. A size of the matrix A is t×k. The matrix A may indicate correlation between each word in the input sentence and each video frame in the video, and therefore may also be referred to as a correlation matrix.

Next, normalization processing (for example, normalization processing may be performed by using softmax) may be performed on a column direction of the matrix A, and then weighting processing is performed in a row direction of the matrix A. In this case, a weighted word may be selected for each video frame in the video, a new semantic feature sequence $\{w'_1, w'_2, \ldots, w'_t\}$ may be formed based on semantic features corresponding to these weighted words. $w'_j$ is a semantic feature of a weighted word corresponding to a $j^{th}$ video frame.

In this case, the semantic feature sequence $\{w'_1, w'_2, \ldots, w'_k\}$ may be used as a convolution kernel to perform semantic enhancement (namely, convolution processing) on video frames (namely, the video feature sequence $\{f_1, f_2, \ldots, f_t\}$ of the video) in the video, to obtain a semantic-enhanced video feature sequence of the video.

It should be noted that, the foregoing convolution kernel (namely, the semantic feature sequence $\{w'_1, w'_2, \ldots, w'_k\}$) is different from a conventional convolution kernel in two aspects:

1. A weight of the convolution kernel is not included in a model but is dynamically determined by using an input semantic meaning.

The weight of the convolution kernel is dynamically determined by using the input sentence, so that the model is very flexible. A video feature of an extracted video frame can be determined by using a semantic meaning of the input sentence, and another video clip of interest in the same video can be easily detected by replacing the input sentence.

2. During convolution processing, a same convolution kernel is usually used for transforming on each position. However, in the semantic enhancement submodule 1031, convolutional (namely, semantic enhancement) is performed on each video frame by using a weighted word corresponding to the video frame.

Convolution is performed on each video frame by using the corresponding weighted word, so that a relationship between the video frame and the word can be explored at a finer granularity. Semantic enhancement is performed on the video frame by using details (a semantic feature corresponding to the word) corresponding to the word, so that the video feature of the video frame can be more accurate.

(2) Context Interaction Submodule 1032

The context interaction submodule 1032 may fuse content of another video frame (namely, context information) in the video into the video frame in the video.

Optionally, in the context interaction submodule 1032, context interaction may be performed in the following two manners:

Manner 1:

Context interaction is performed in an average pooling manner.

For example, for the video feature sequence $\{f_1, f_2, \ldots, f_t\}$ of the video, an average value of all video features in the video feature sequence is calculated to obtain an average value f'. Then, the average value f' is added to the video feature $f_j$ of a $j^{th}$ video frame in the video.

Manner 2:

The other manner is similar to a manner of semantic enhancement performed by the semantic enhancement submodule 1031. This manner is similar to a manner of sensing two different modalities in the module 1031.

For example, for the video feature sequence $\{f_1, f_2, \ldots, f_t\}$ of the video, video features in the video feature sequence $\{f_1, f_2, \ldots, f_t\}$ are multiplied in pair (matrix multiplication) to obtain a matrix B, where a size of the matrix B is txt. Then, normalization processing may be performed in a column direction of the matrix B (for example, normalization processing may be performed by using softmax), and weighting processing is performed in a row direction of the matrix B. In this case, a weighted video frame may be selected for each video frame in the video, and a video feature of the weighted video frame is added to the video frame, so that context interaction of the video frame is completed.

(3) Time Domain Structure Construction Submodule 1033

The time-domain structure construction submodule 1033 may construct a hierarchical structure of the video in the time domain.

Optionally, the time domain structure construction submodule 1033 may receive the video feature sequence processed by the context interaction submodule 1032 and perform one-dimensional dilated convolution on the video feature sequence, to obtain the hierarchical structure (namely, the candidate video feature sequence of the video) of the video in the time domain.

Step 3:

As shown in FIG. 8, the clip sampling module 104 samples the candidate video feature sequence of the video, to obtain video feature sequences of a plurality of video clips.

Optionally, the clip sampling module 104 receives the candidate video feature sequence of the video and generates a plurality of video clips of the video according to a preset rule.

For example, in the candidate video feature sequence of the video, video features of seven video frames may be sampled at equal intervals in a chronological order, and then the video features of the seven video frames may form a video clip in the chronological order between the video features, in other words, the video clip is generated.

If time coordinates of the sampled video frames are not aligned with a time coordinate of a video frame in the video, a linear interpolation method may be used for aligning the time coordinates of the sampled video frames.

Optionally, the video feature that is of the video clip and that is obtained through sampling may be input into the integrated interaction module 103 for integrated interaction processing.

Step 4:

As shown in FIG. 8, the integrated interaction module 103 performs, based on the semantic feature sequence of the input sentence, integrated interaction processing on the video feature sequences of the plurality of video clips, to obtain candidate video feature sequences of the plurality of video clips.

Optionally, in step 4, a method for the integrated interaction module 103 to perform integrated interaction processing on the video feature sequences of the plurality of video clips is similar to that in step 2. Details are not described herein again.

When the time domain structure construction submodule 1033 determines a hierarchical structure (namely, the candidate video feature sequence of the video clip) of the video clip in the time domain, one-dimensional convolution may be performed on the video feature sequence of the video clip.

Step 5:

As shown in FIG. 8, the matching degree calculation module 105 calculates a matching degree (or similarity) between the semantic feature sequence of the input sentence and a video feature sequence of each video clip of the plurality of video clips, and determines, based on the matching degree obtained through calculation, whether the video clip (corresponding to the matching degree) is a target video clip corresponding to the input sentence.

For example, a video clip with a largest matching degree (a value of the matching degree) in the plurality of video clips may be determined as the target video clip.

It should be noted that the target video clip herein may be a video clip that best matches the semantic feature of the input sentence in the plurality of video clips generated by the video; or may be a video clip whose content is the most similar (or closest) to the semantic meaning expressed by the input sentence.

To describe an effect of the video processing method in this embodiment, the following analyzes, based on a test result, accuracy of recognizing the target video clip corresponding to the input sentence according to the video processing method in this embodiment.

TABLE 1

| Method | Rank@1 accuracy |
|---|---|
| TMN | 22.92% |
| MCN | 28.10% |
| TGN | 28.23% |
| This embodiment | 32.45% |

The table 1 shows accuracy of recognizing a target video clip corresponding to an input sentence in different solutions on the DiDeMo dataset.

It can be known from the table 1 that, accuracy of performing recognition by using a method in a temporal modular network (TMN) is 22.92%, accuracy of performing recognition by using a method in a moment context network (MCN) is 28.10%, accuracy of performing recognition by using a method in a time domain positioning network (TGN) is 28.23%, and accuracy of performing recognition by using the video processing method is 32.45%. It can be understood that, compared with the several methods in the table 1, according to the video processing method, accuracy of Rank@ 1 can be greatly improved.

TABLE 2

| Method | IoU = 0.5, Rank@1 accuracy | IoU = 0.7, Rank@1 accuracy |
|---|---|---|
| CTRL | 23.63% | 8.89% |
| ACL | 30.48% | 12.20% |
| SAP | 27.42% | 13.36% |
| LSTM | 35.6% | 15.8% |
| This embodiment | 41.69% | 22.88% |

The table 2 shows accuracy of recognizing a target video clip corresponding to an input sentence in different solutions on the Charades-STA dataset. The IoU is intersection over union (IoU).

It can be understood from Table 2 that, if IoU=0.5, accuracy of performing recognition by using a method of a cross-modal temporal regression localizer (CTRL) is 23.63%, and accuracy of performing recognition by using a method of an activity concepts based localizer (ACL) is 30.48%, accuracy of performing recognition by using a method in semantic activity proposal (SAP) is 27.42%, accuracy of performing recognition by using a method in a long-short term memory (LSTM) is 35.6%, and accuracy of performing recognition by using the video processing method is 41.69%.

If IoU=0.7, accuracy of performing recognition by using a method of a CTRL is 8.89%, accuracy of performing recognition by using a method of an ACL is 12.20%, accuracy of performing recognition by using a method of an SAP is 13.36%, accuracy of performing recognition by using a method of an LSTM is 15.8%, and accuracy of performing recognition by using the video processing method is 22.88%.

It can be understood that, compared with the several methods in Table 2, according to the video processing method, accuracy of Rank@ 1 can be greatly improved.

In conclusion, in this embodiment, semantic enhancement is performed on the video frame based on the semantic feature, to obtain the video feature of the video frame, and a semantic meaning corresponding to the input sentence may be fused into the video feature of the video frame. In this case, the target video clip corresponding to the input sentence is recognized based on the semantic feature and the video feature, so that accuracy of recognizing the target video clip corresponding to the input sentence can be effectively improved.

Figure 9:
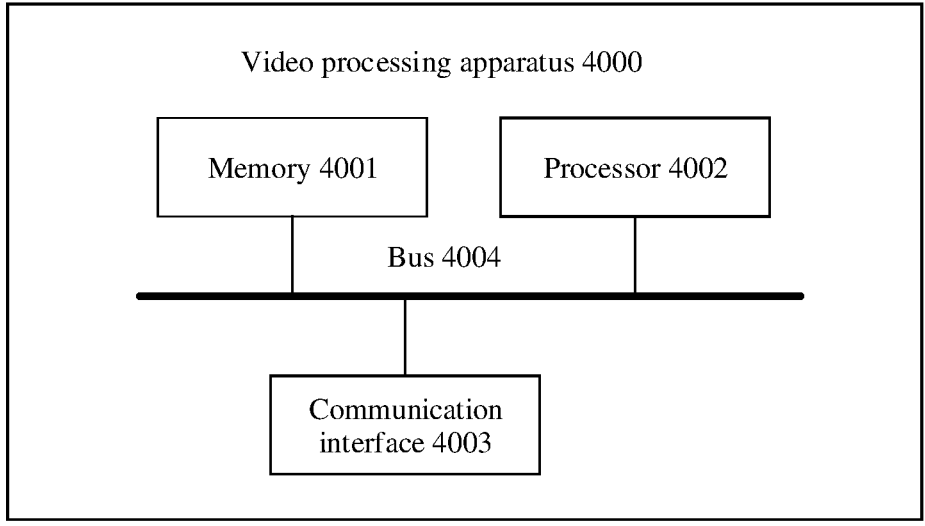
FIG. 9 is a schematic diagram of a hardware structure of a video processing apparatus according to an embodiment.

FIG. 9 is a schematic diagram of a hardware structure of a video processing apparatus according to an embodiment. As shown in FIG. 9, the video processing apparatus 4000 includes a memory 4001, a processor 4002, a communication interface 4003, and a bus 4004. Communication connections between the memory 4001, the processor 4002, and the communication interface 4003 are implemented through the bus 4004.

The memory 4001 may be a read-only memory (ROM), a static storage device, a dynamic storage device, or a random access memory (RAM). The memory 4001 may store a program. When the program stored in the memory 4001 is executed by the processor 4002, the processor 4002 and the communication interface 4003 are configured to perform steps of the video processing apparatus in the embodiments.

The processor 4002 may be a general-purpose central processing unit (CPU), a microprocessor, an application-specific integrated circuit (ASIC), a graphics processing unit (GPU), or one or more integrated circuits, and is configured to execute a related program, to implement a function that needs to be performed by a unit of the video processing apparatus in the embodiments, or perform the video processing method in the method embodiments.

The processor 4002 may alternatively be an integrated circuit chip and has a signal processing capability. In an implementation process, steps of the video processing method in the embodiments can be implemented by using a hardware integrated logic circuit or an instruction in a form of software in the processor 4002.

The foregoing processor 4002 may be further a general-purpose processor, a digital signal processor (DSP), an ASIC, a field programmable gate array (FPGA) or another programmable logic device, a discrete gate or transistor logic device, or a discrete hardware component. The foregoing general-purpose processor may be a microprocessor, or the processor may be any conventional processor or the like. The steps of the methods with reference to the embodiments may be directly performed and completed by a hardware decoding processor or may be performed and completed by using a combination of hardware and software modules in the decoding processor. The software module may be located in a storage medium mature in the art, such as a random access memory, a flash memory, a read-only memory, a programmable read-only memory, an electrically erasable programmable memory, a register, or the like. The storage medium is located in the memory 4001. The processor 4002 reads information in the memory 4001, and completes, in combination with hardware of the processor

4002, a function that needs to be executed by a unit included in the video processing apparatus in this embodiment or performs the video processing method in the method embodiments.

The communication interface 4003 uses a transceiver apparatus, for example, but not limited to, a transceiver, to implement communication between the apparatus 4000 and another device or a communication network. For example, an input sentence and a to-be-processed video frame (or video) may be obtained through the communication interface 4003.

The bus 4004 may include a path for information transfer between various components (for example, the memory 4001, the processor 4002, and the communication interface 4003) of the apparatus 4000.

Figure 10:
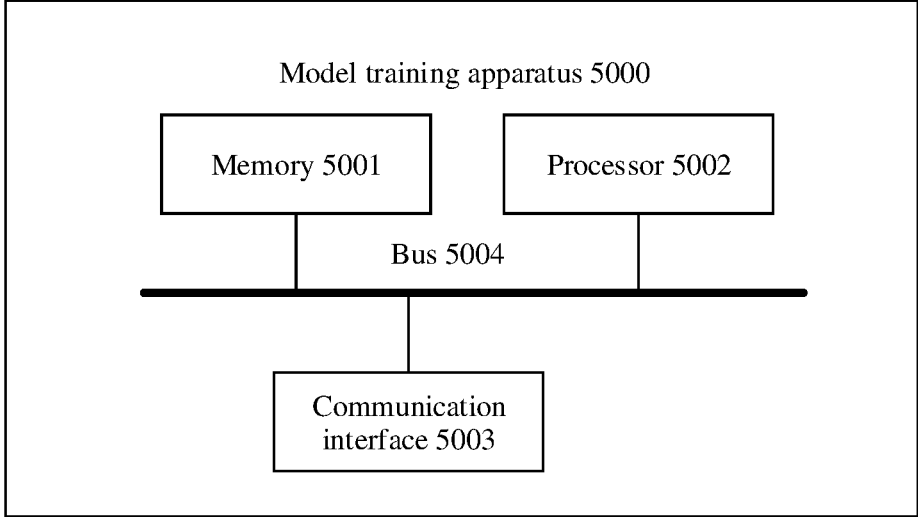
FIG. 10 is a schematic diagram of a hardware structure of a video processing apparatus according to an embodiment.

FIG. 10 is a schematic diagram of a hardware structure of a model training apparatus 5000 according to an embodiment. Similar to the foregoing apparatus 4000, the model training apparatus 5000 shown in FIG. 10 includes a memory 5001, a processor 5002, a communication interface 5003, and a bus 5004. Communication connections between the memory 5001, the processor 5002, and the communication interface 5003 are implemented through the bus 5004.

The memory 5001 may store a program. When the program stored in the memory 5001 is executed by the processor 5002, the processor 5002 is configured to perform the steps of a training method for training the video processing apparatus in the embodiments.

The processor 5002 may be a general-purpose CPU, a microprocessor, an ASIC, a GPU, or one or more integrated circuits, and is configured to execute a related program, to implement the training method for training the video processing apparatus in the embodiments.

The processor 5002 may alternatively be an integrated circuit chip and has a signal processing capability. In a training implementation process, steps of the training method of the video processing apparatus in the embodiments can be implemented by using a hardware integrated logic circuit or an instruction in a form of software in the processor 5002.

It should be understood that the model training apparatus 5000 shown in FIG. 10 trains the video processing apparatus, and the video processing apparatus obtained through training may be configured to perform the video processing method in the embodiments. The video processing apparatus in the method shown in FIG. 5 or the video processing apparatus shown in FIG. 6 can be obtained by training a neural network by using the apparatus 5000.

The apparatus shown in FIG. 10 may obtain training data and a to-be-trained video processing apparatus from outside through the communication interface 5003, and then the processor trains the to-be-trained video processing apparatus based on the training data.

Optionally, the training data may include an input sentence, a training video, and a video clip that is in the training video and that has a highest matching degree with the input sentence. The video clip that is in the training video and that has the highest matching degree with the input sentence may be a manually pre-labeled video clip.

It should be noted that, although only the memory, the processor, and the communication interface are shown in each of the apparatus 4000 and the apparatus 5000, in an implementation process, a person skilled in the art should understand that the apparatus 4000 and the apparatus 5000 each may further include another component necessary for normal running In addition, according to a requirement, a person skilled in the art should understand that the apparatus

4000 and the apparatus 5000 may further include hardware components for implementing other additional functions. In addition, a person skilled in the art should understand that the apparatus 4000 and the apparatus 5000 each may include only components necessary for implementing the embodiments, but not necessarily include all the components shown in FIG. 9 and FIG. 10.

It should be understood that the processor in the embodiments may be a central processing unit (CPU). The processor may be further another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be further understood that the memory in the embodiments may be a volatile memory or a nonvolatile memory or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through example but not limitative description, random access memories (RAMs) in various forms are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (direct rambus RAM, DR RAM).

All or some of the foregoing embodiments may be implemented by using software, hardware, firmware, or any combination thereof. When the software is used for implementing embodiments, all or some of the foregoing embodiments may be implemented in a form of a computer program product. The computer program product includes one or more computer instructions or computer programs. When the computer instructions or the computer programs are loaded and executed on the computer, the procedure or functions according to some embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "I" in this specification usually represents an "or" relationship between the associated objects or may represent an "and/or" relationship. The meaning depends on the context.

"At least one" refers to one or more, and "a plurality of" refers to two or more. "At least one item (piece) of the following" or a similar expression thereof indicates any combination of the items, including any combination of singular items (pieces) or plural items (pieces). For example, at least one item (piece) of a, b, or c may indicate a, b, c, a and b, a and c, b and c, or a, b, and c, where a, b, and c may be singular or plural.

It should be understood that sequence numbers of the foregoing processes do not mean execution sequences in the various embodiments. The execution sequences of the processes should be determined based on functions and internal logic of the processes but should not be construed as any limitation on the implementation processes in the embodiments.

A person of ordinary skill in the art may be aware that, in combination with the examples described in the embodiments, units and algorithm steps may be implemented by electronic hardware or a combination of computer software and electronic hardware. Whether the functions are performed by hardware or software depends on particular applications and constraint conditions of the solutions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objective of the solutions of embodiments.

In addition, functional units in the embodiments may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the solutions essentially, or the part contributing to the conventional technology, or some of the solutions may be implemented in a form of a software product. The computer software product is stored in a storage medium and includes several instructions for instructing a computer device (which may be a personal computer, a server, a network device, or the like) to perform all or some of the steps of the methods described in the embodiments. The foregoing storage medium includes various media that can store program code, such as a USB flash drive, a removable hard disk, a read-only memory (ROM), a random access memory (RAM), a magnetic disk, or an optical disc.

The foregoing descriptions are merely implementations but are not intended to limit the scope of the embodiments. Any variation or replacement readily figured out by a person skilled in the art shall fall within the scope of the embodiments.

What is claimed is:

1. A video processing method comprising:
   extracting, with a convolutional neural network (CNN) combined with a recurrent neural network (RNN), a semantic feature of an input sentence;
   performing semantic enhancement on a video frame based on the semantic feature to obtain a video feature of the video frame, wherein the video feature is obtained through convolution processing using a convolution kernel determined based on the semantic feature, and wherein the semantic enhancement comprises contextual interaction among video frames by exchanging features between the video frame and at least one other video frame in the same video via a context interaction submodule; and
   determining, based on the semantic feature and the video feature, whether a video clip to which the video frame belongs is a target video clip corresponding to the input sentence.

2. The video processing method according to claim 1, wherein performing the semantic enhancement on the video frame based on the semantic feature, to obtain the video feature of the video frame further comprises:
   determining a word corresponding to the video frame in the input sentence; and
   performing semantic enhancement on the video frame based on a semantic feature of the word corresponding to the video frame to obtain the video feature of the video frame.

3. The video processing method according to claim 1, wherein performing the semantic enhancement on the video frame based on the semantic feature, to obtain the video feature of the video frame in the video further comprises:
   performing feature extraction, with the CNN, on the video frame based on the semantic feature, to obtain the video feature of the video frame.

4. The video processing method according to claim 1, further comprising:
   obtaining an initial video feature of the video frame; and
   performing the semantic enhancement on the video frame based on the semantic feature, to obtain the video feature of the video frame further comprises:
   performing semantic enhancement on the initial video feature based on the semantic feature, to obtain the video feature of the video frame.

5. The video processing method according to claim 1, further comprising:
   performing feature fusion on the video feature of the video frame by using a video feature of at least one other video frame to obtain a fused video feature of the video frame, wherein the at least one other video frame and the video frame belong to a same video; and determining, based on the semantic feature and the video feature, whether the video clip to which the video frame belongs is the target video clip corresponding to the input sentence further comprises:

determining, based on the semantic feature and the fused video feature, whether the video clip to which the video frame belongs is the target video clip corresponding to the input sentence.

6. The video processing method according to claim 1, wherein determining, based on the semantic feature and the video feature, whether the video clip to which the video frame belongs is the target video clip corresponding to the input sentence further comprises:

determining a hierarchical structure of the video clip in time domain based on the video feature; and determining, based on the semantic feature and the hierarchical structure, whether the video clip is the target video clip corresponding to the input sentence.

7. A video processing apparatus, comprising a processor and a memory, wherein the memory is configured to store program instructions, and the processor is configured to invoke the program instructions to perform:

extracting, with a convolutional neural network (CNN) combined with a recurrent neural network (RNN), a semantic feature of an input sentence;

performing semantic enhancement on a video frame based on the semantic feature, to obtain a video feature of the video frame, wherein the video feature is obtained through convolution processing using a convolution kernel determined based on the semantic feature, and wherein the semantic enhancement comprises contextual interaction among video frames by exchanging features between the video frame and at least one other video frame in the same video via a context interaction submodule; and determining, based on the semantic feature and the video feature, whether a video clip to which the video frame belongs is a target video clip corresponding to the input sentence.

8. The video processing apparatus according to claim 7, wherein performing the semantic enhancement on the video frame based on the semantic feature, to obtain the video feature of the video frame further comprises:

determining a word corresponding to the video frame in the input sentence; and performing semantic enhancement on the video frame based on a semantic feature of the word corresponding to the video frame to obtain the video feature of the video frame.

9. The video processing apparatus according to claim 7, wherein performing the semantic enhancement on the video frame based on the semantic feature, to obtain the video feature of the video frame in the video further comprises:

performing feature extraction, with the CNN, on the video frame based on the semantic feature, to obtain the video feature of the video frame.

10. The video processing apparatus according to claim 7, wherein the processor is further configured to: obtain an initial video feature of the video frame; and performing the semantic enhancement on the video frame based on the semantic feature, to obtain the video feature of the video frame further comprises:

performing semantic enhancement on the initial video feature based on the semantic feature, to obtain the video feature of the video frame.

11. The video processing apparatus according to claim 7, wherein the processor is further configured to:

perform feature fusion on the video feature of the video frame by using a video feature of at least one other video frame to obtain a fused video feature of the video frame, wherein the at least one other video frame and the video frame belong to a same video; and determining, based on the semantic feature and the video feature, whether the video clip to which the video frame belongs is the target video clip corresponding to the input sentence further comprises:

determining, based on the semantic feature and the fused video feature, whether the video clip to which the video frame belongs is the target video clip corresponding to the input sentence.

12. The video processing apparatus according to claim 7, wherein determining, based on the semantic feature and the video feature, whether the video clip to which the video frame belongs is the target video clip corresponding to the input sentence further comprises:

determining a hierarchical structure of the video clip in time domain based on the video feature; and determining, based on the semantic feature and the hierarchical structure, whether the video clip is the target video clip corresponding to the input sentence.

13. A non-transitory computer-readable storage medium, wherein the non-transitory computer-readable medium stores program code to be executed by a device, and the program code is used for performing:

extracting, with a convolutional neural network (CNN) combined with a recurrent neural network (RNN), a semantic feature of an input sentence;

performing semantic enhancement on a video frame based on the semantic feature, to obtain a video feature of the video frame, wherein the video feature is obtained through convolution processing using a convolution kernel determined based on the semantic feature, and wherein the semantic enhancement comprises contextual interaction among video frames by exchanging features between the video frame and at least one other video frame in the same video via a context interaction submodule; and determining, based on the semantic feature and the video feature, whether a video clip to which the video frame belongs is a target video clip corresponding to the input sentence.

14. The non-transitory computer-readable storage medium according to claim 13, wherein performing the semantic enhancement on the video frame based on the semantic feature, to obtain the video feature of the video frame further comprises:

determining a word corresponding to the video frame in the input sentence; and performing semantic enhancement on the video frame based on a semantic feature of the word corresponding to the video frame to obtain the video feature of the video frame.

15. The non-transitory computer-readable storage medium according to claim 13, wherein performing the semantic enhancement on the video frame based on the semantic feature, to obtain the video feature of the video frame in the video further comprises:

performing feature extraction, with the CNN, on the video frame based on the semantic feature, to obtain the video feature of the video frame.

16. The non-transitory computer-readable storage medium according to claim 13, wherein the program code is further used for:

obtaining an initial video feature of the video frame; and performing the semantic enhancement on the video frame based on the semantic feature, to obtain the video feature of the video frame further comprises:

performing semantic enhancement on the initial video feature based on the semantic feature, to obtain the video feature of the video frame.

17. The non-transitory computer-readable storage medium according to claim 13, wherein the program code is further used for:

performing feature fusion on the video feature of the video frame by using a video feature of at least one other video frame to obtain a fused video feature of the video frame, wherein the at least one other video frame and the video frame belong to a same video; and determining, based on the semantic feature and the video feature, whether the video clip to which the video frame belongs is the target video clip corresponding to the input sentence further comprises:

determining, based on the semantic feature and the fused video feature, whether the video clip to which the video frame belongs is the target video clip corresponding to the input sentence.

18. The non-transitory computer-readable storage medium according claim 13, wherein determining, based on the semantic feature and the video feature, whether the video clip to which the video frame belongs is the target video clip corresponding to the input sentence further comprises:

determining a hierarchical structure of the video clip in time domain based on the video feature; and determining, based on the semantic feature and the hierarchical structure, whether the video clip is the target video clip corresponding to the input sentence.

* * * * *